United States Patent [19]
Zolock

[11] Patent Number: 4,879,911
[45] Date of Patent: Nov. 14, 1989

[54] CORIOLIS MASS FLOW RATE METER HAVING FOUR PULSE HARMONIC REJECTION

[75] Inventor: Michael J. Zolock, Longmont, Colo.

[73] Assignee: Micro Motion, Incorporated, Boulder, Colo.

[21] Appl. No.: 217,012

[22] Filed: Jul. 8, 1988

[51] Int. Cl.⁴ .............................................. G01F 1/84
[52] U.S. Cl. .................................................. 73/861.38
[58] Field of Search ......................... 73/861.37, 861.38

[56] References Cited

U.S. PATENT DOCUMENTS 4,192,184  3/1980  Cox et al. ......................... 73/861.38

Primary Examiner—Herbert Goldstein
Attorney, Agent, or Firm—Peter L. Michaelson

[57] ABSTRACT

Apparatus and accompanying methods are disclosed for use in a Coriolis mass flow rate meter for providing a mass flow rate signal that has a substantially reduced harmonic content. Specifically, this apparatus measures the Coriolis force induced time interval, Δt, by measuring the time intervals that occur between each of two measurement points situated on one, e.g. the right, position (or velocity) waveform and a reference point situated on the other, e.g. left, position (or velocity) waveform and which temporarily occurs between each of the two measurement points.

23 Claims, 16 Drawing Sheets

FLOW (POSITIVE DIRECTION)

NO FLOW

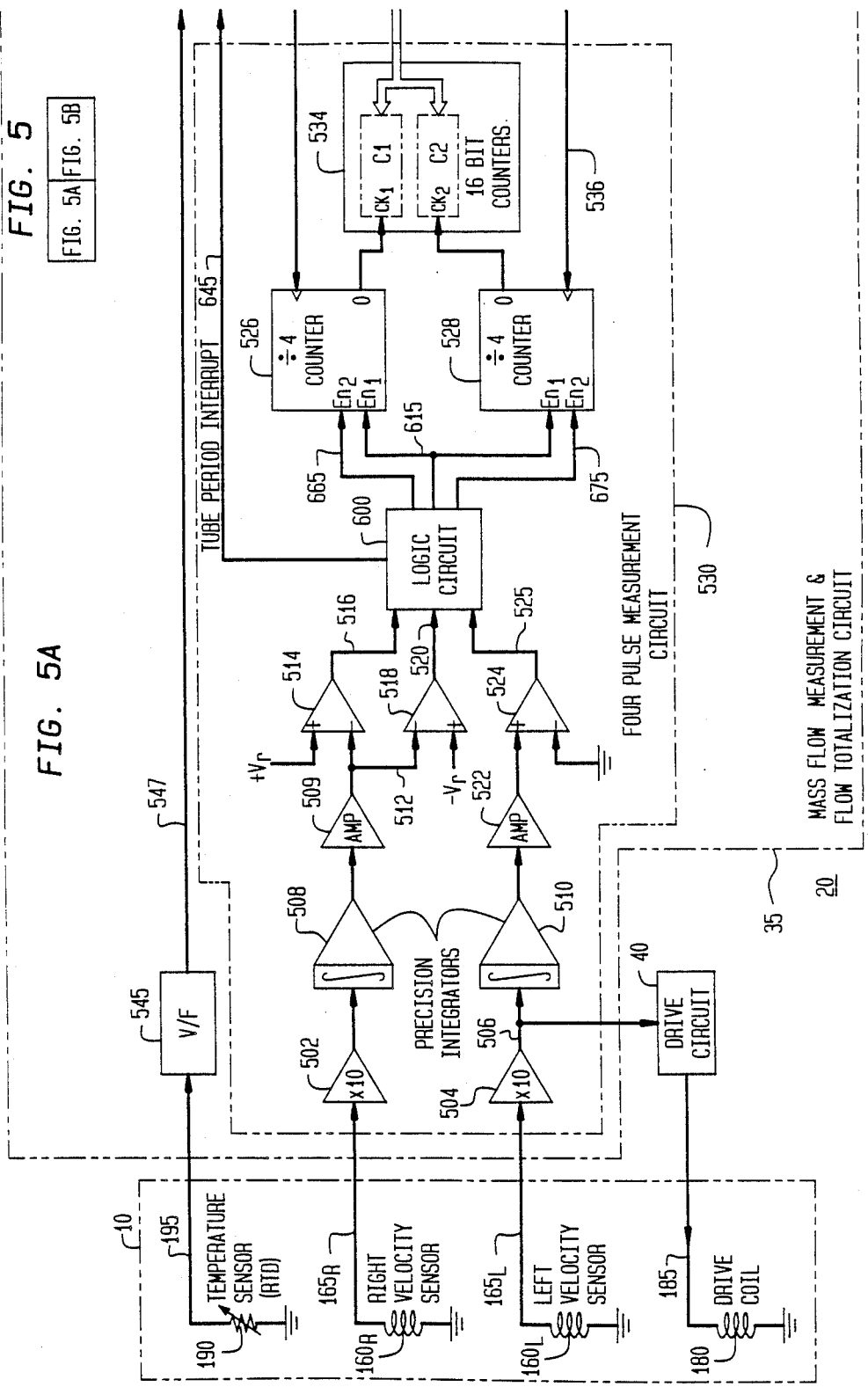

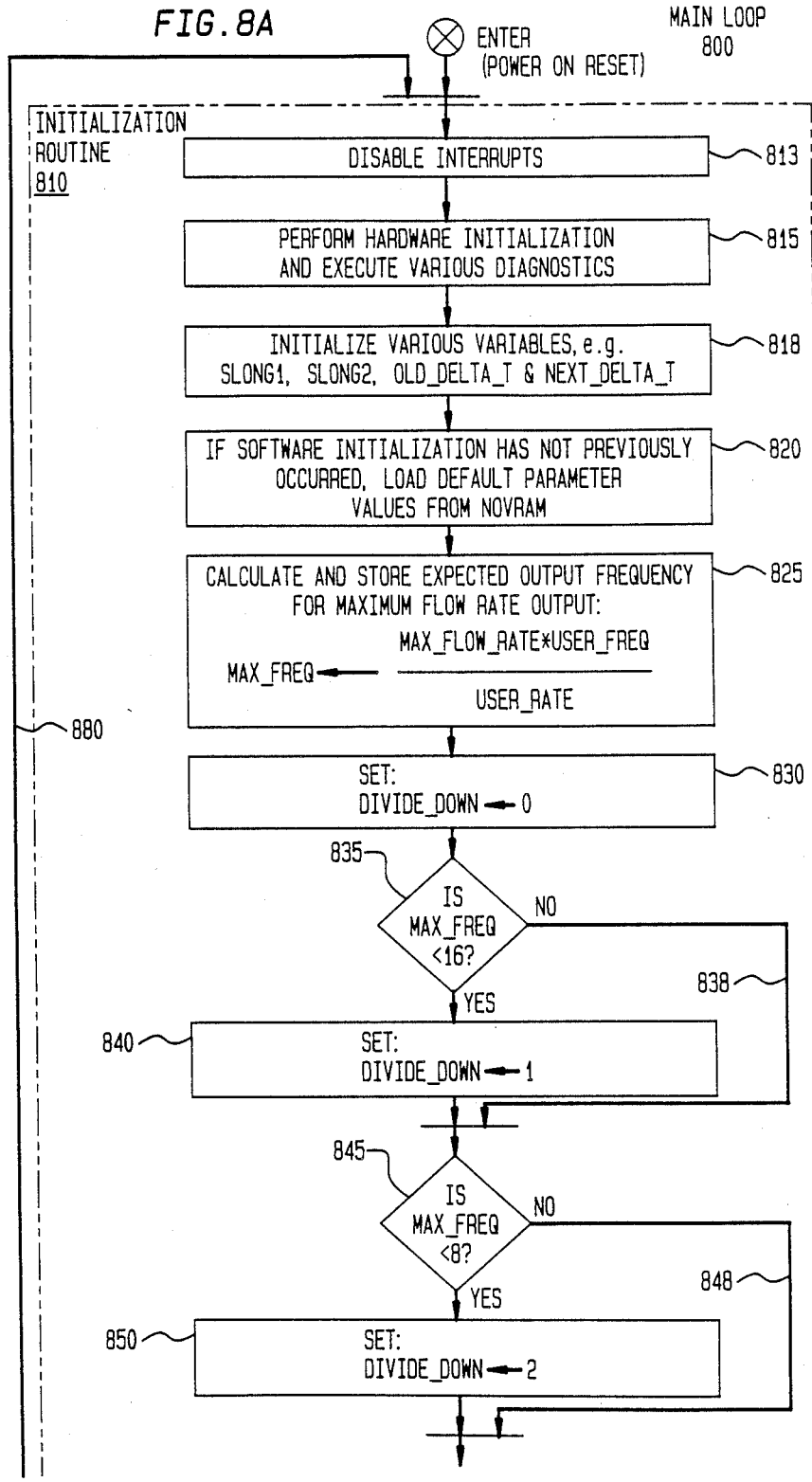

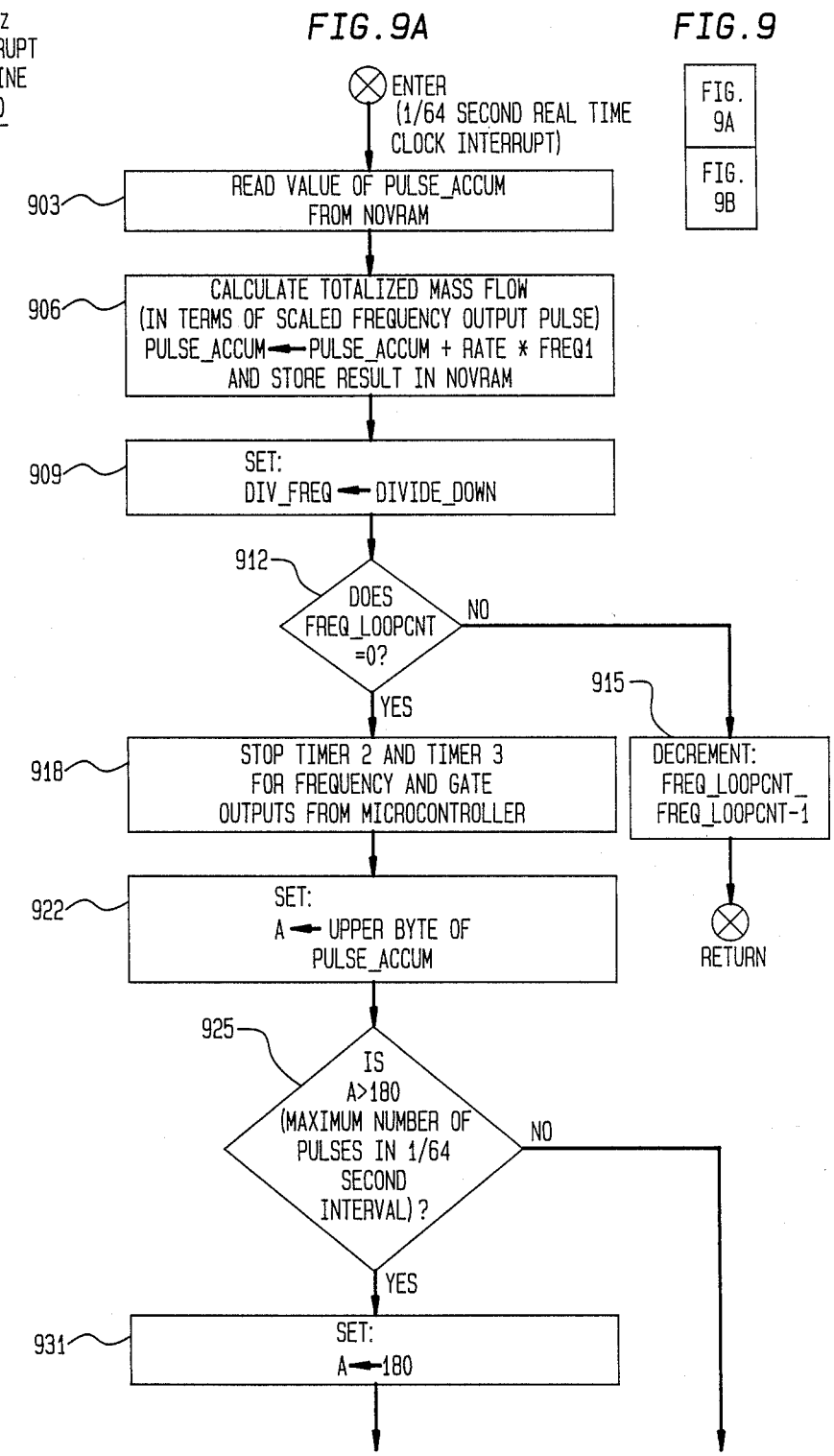

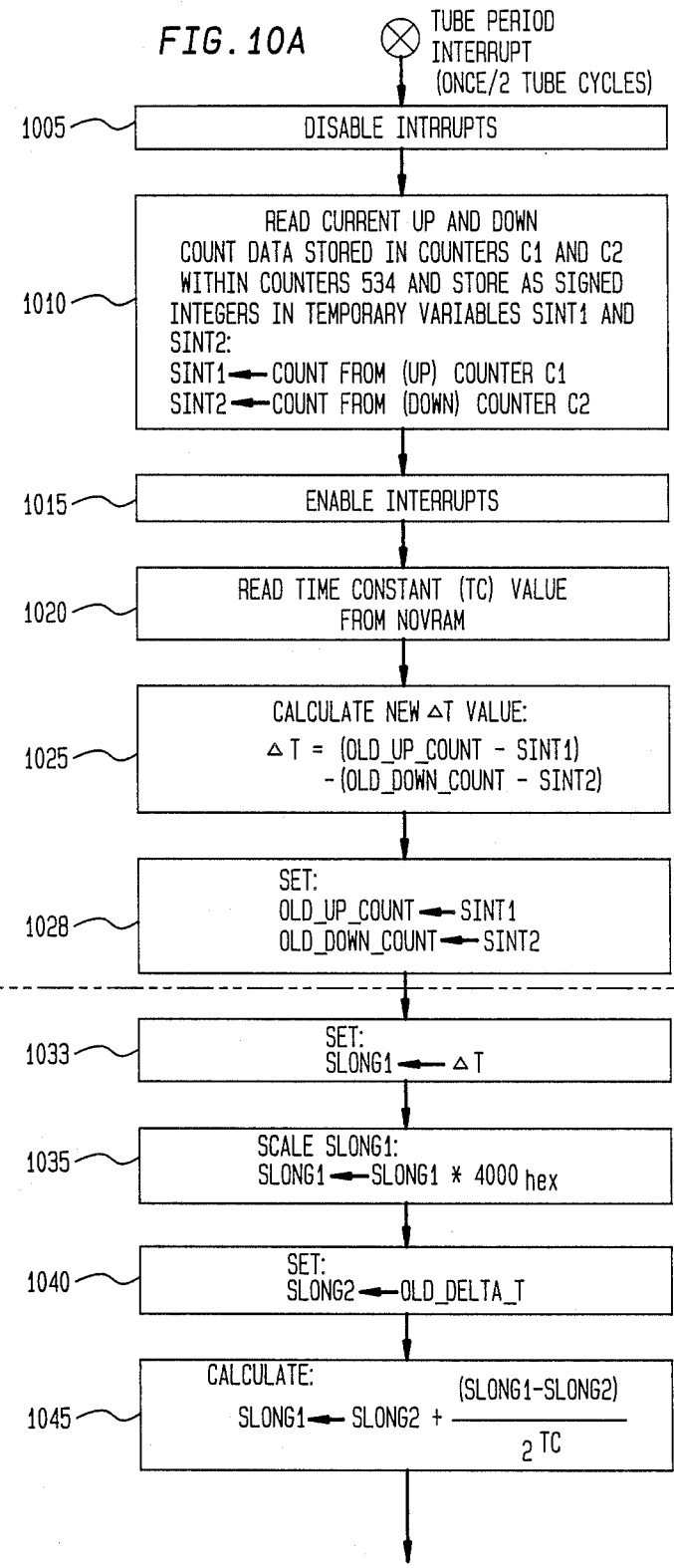

CORIOLIS MASS FLOW RATE METER HAVING FOUR PULSE HARMONIC REJECTION

CROSS REFERENCE TO RELATED APPLICATION

This application describes and claims subject matter that is also described in co-pending U.S. patent application entitled "CORIOLIS MASS FLOW RATE METER HAVING AN ABSOLUTE FREQUENCY OUTPUT SIGNAL" that has been filed simultaneously herewith, assigned serial number 216,760 and has been assigned to the same assignee herein.

BACKGROUND OF THE INVENTION

1. Technical Field of the Invention

The invention relates to apparatus and accompanying methods for use in a Coriolis mass flow rate meter for providing a mass flow rate signal that has a substantially reduced harmonic content.

2. Description of the Prior Art

Currently, Coriolis mass flow rate meters are finding increasing use as an accurate way to measure the mass flow rate of various process fluids in many applications.

Generally speaking, a Coriolis mass flow rate meter, such as that described in U.S. Pat. No. 4,491,025 (issued to J. E. Smith et al on Jan. 1, 1985), contains one or two parallel conduits, each typically being a U-shaped flow conduit or tube. Each flow conduit is driven to oscillate about an axis to create a rotational frame of reference. For a U-shaped flow conduit, this axis can be termed the bending axis. As process fluid flows through each oscillating flow conduit, movement of the fluid produces reactionary Coriolis forces that are orthogonal to both the velocity of the fluid and the angular velocity of the conduit. These reactionary Coriolis forces cause each conduit to twist about a torsional axis that, for a U-shaped flow conduit, is normal to its bending axis. The amount of twist imparted to each conduit is related to the mass flow rate of the process fluid flowing therethrough. This twist is frequently measured using velocity signals obtained from magnetic velocity sensors that are mounted to one or both of the flow conduits in order to provide a complete velocity profile of the movement of each flow conduit with respect either to the other conduit or a fixed reference.

In such a meter, the mass flow rate of a fluid that moves through the meter is proportional to the time interval that elapses between the instant one point situated on a side leg of a flow conduit crosses a pre-determined location, e.g. a respective mid-plane of oscillation, until the instant a corresponding point situated on the opposite side leg of the same flow conduit, crosses its corresponding location, e.g. its respective mid-plane of oscillation. For parallel dual conduit Coriolis mass flow rate meters, this interval is equal to the phase difference between the velocity signals generated for both flow conduits at the fundamental (resonant) frequency at which the flow conduits are driven. Hence, a critical goal of Coriolis mass flow rate meter designs is to measure a time interval for conduit movement that occurs only at the fundamental frequency at which the flow conduits are being driven.

Traditionally, this time interval is measured by using traditional zero crossing or level detection techniques to detect the occurrence of corresponding points on both velocity sensor signals. I have observed that time interval measurements obtained in this fashion contain components resulting from harmonics of the fundamental driving frequency of the flow conduit. These harmonics are frequently caused by non-linearities existing in the mechanical metering assembly itself and/or in the magnetic velocity sensors. Unfortunately, these harmonics disadvantageously inject error into the time interval measurements which, in turn, contaminate the velocity signal produced by either tube sensor. This error causes the phase shift between the two flow conduit sensor signals to disadvantageously change from its true value and hence adversely affect the overall accuracy of the meter. Specifically, these time delays appear as a phase difference between velocity sensor signals for each of the two flow conduits. Harmonics, particularly those having a non-zero value at zero crossings of the fundamental flow conduit driving frequency, impart an error component that resembles a phase shift to each velocity waveform. This error component can increase significantly as the phase relationship of a given harmonic to the fundamental driving frequency changes. For example, certain harmonics, such as the third harmonic, may not be noticeable at certain phase differences but become quite prevalent at other phase differences. Inasmuch as the phase shift attributable to mass flow rate is often a small value, then any harmonic content may inject a noticeable error component into measured phase shift and thereby into the measurement of the actual mass flow rate of the fluid as it travels through the meter. Consequently, the measured time difference will not only contain a true phase shift component attributable to actual mass flow rate but also an error component due to harmonic content. Of all the harmonics of the driving frequency, the second harmonic imparts the largest error component. Mass flow rate measurements predicated on such time interval measurements will consequently contain an error component.

Although the art teaches several techniques aimed at removing harmonics in Coriolis mass flow rate meters, all of these techniques possess various drawbacks. In particular, in one technique that is often used, the zero (or level) crossing detectors are preceded by a bandpass filter, such as a well known Chebyshev or Butterworth type analog filter. Unfortunately, the output of these filters varies with temperature. Moreover, it is difficult to provide two such analog filters that are exactly matched to each other for temperature variations. Consequently, if two analog filters contain a slight temperature characteristic mis-match, as frequently occurs, any temperature variation disadvantageously will likely inject error into the phase and hence into the mass flow rate measurements. Another technique which is directed at eliminating this error inherent in analog filters involves converting the analog signals produced by the flow conduit sensors into a stream of digital values, digitally filtering these values and then reconverting the results back into the analog domain to measure the phase using conventional zero (or level) crossing detectors. Unfortunately, such an approach is quite complex and unnecessarily expensive to implement in a commercial meter.

Moreover, harmonics often do not occur under laboratory metering conditions. In fact, harmonics, particularly the second harmonic, do not occur under all flow conditions. Moreover, under field conditions, the actual harmonics that result in a given installation are often nearly impossible to predict. Furthermore, the density of the measured process fluid may and often does change from time to time. Consequently, the resonant frequency at which the flow conduits vibrate and the frequency of all the harmonics thereof will correspondingly shift with a density change. Consequently, the difficulty of predicting which harmonics, if any, will occur in any given field situation coupled with subsequent frequency shifts in these harmonics caused by density changes exacerbate and further complicate the problem of filtering these harmonics from the velocity sensor signals and/or time interval measurements.

Due to the apparent difficulty and attendant expense associated with the problem of adequately removing harmonics from velocity sensor signals and/or time interval measurements, it appears that the art has merely accepted the fact that such signals and measurements used in Coriolis mass flow rate meters will inherently contain harmonics that can not be readily removed or filtered. Since harmonics can generate errors that are simply unacceptably large in certain high accuracy metering applications, the art has chosen to accept a view that Coriolis mass flow rate meters inherently possess a limited accuracy which, in turn, precludes their use in certain applications for which they would otherwise be ideally suited.

Consequently, a need exists in the art for a highly accurate Coriolis mass flow rate meter and particularly one that produces a mass flow rate signal that has a substantially reduced harmonic content, i.e. frequencies other the fundamental frequency at which the flow conduit is driven.

SUMMARY OF THE INVENTION

An object of the present invention is to provide a Coriolis mass flow rate meter having a substantially higher accuracy than that obtainable from commercially available Coriolis mass flow rate meters known in the art and thus suited for use in high accuracy metering applications.

A specific object is to provide such a high accuracy meter that generates a mass flow rate output signal which contains a substantially reduced harmonic content.

A more specific object is to provide such a high accuracy meter that does not rely on the use of matched analog filters.

Another more specific object is to provide such a high accuracy meter that does not rely on the use of expensive or complex techniques to obtain high accuracy.

These and other objects are provided in accordance with the teachings of the present invention by a Coriolis mass flow rate meter in which the Coriolis force induced time interval, $\Delta t$, is measured by measuring the time intervals that occur between each of two measurement points situated on one, e.g. the right, position (or velocity) waveform and a reference point situated on the other, e.g. left, position (or velocity) waveform and which temporally occurs between each of the two measurement points.

BRIEF DESCRIPTION OF THE DRAWINGS

The teachings of the present invention may be clearly understood by considering the following detailed description in conjunction with the accompanying drawings, in which:

FIG. 5 depicts the correct alignment of the drawing sheets for FIGS. 5A and 5B;

FIGS. 5A and 5B collectively show a block diagram of meter electronics 20 that incorporates the teachings of the present invention and is interfaced to Coriolis mass flow rate meter 10 as shown in FIG. 1;

FIG. 8 depicts the correct alignment of the drawing sheets for FIGS. 8A and 8B;

FIGS. 8A and 8B collectively show a flowchart of Main Loop 800 that is executed by microcontroller 550 shown in FIGS. 5A and 5B;

FIG. 9 depicts the correct alignment of the drawing sheets for FIGS. 9A and 9B;

FIGS. 9A and 9B collectively depict a flowchart of 64 Hz Interrupt Routine 900 that is executed as part of Main Loop 800;

FIG. 10 depicts the correct alignment of the drawing sheets for FIGS. 10A and 10B;

FIGS. 10A and 10B collectively depict a flowchart of Tube Period Interrupt Routine 1000 that is executed as part of Main Loop 800.

To facilitate understanding, identical numerals have been used wherever possible to designate identical elements that are common to the figures.

DETAILED DESCRIPTION

A. Hardware

Figure 1:
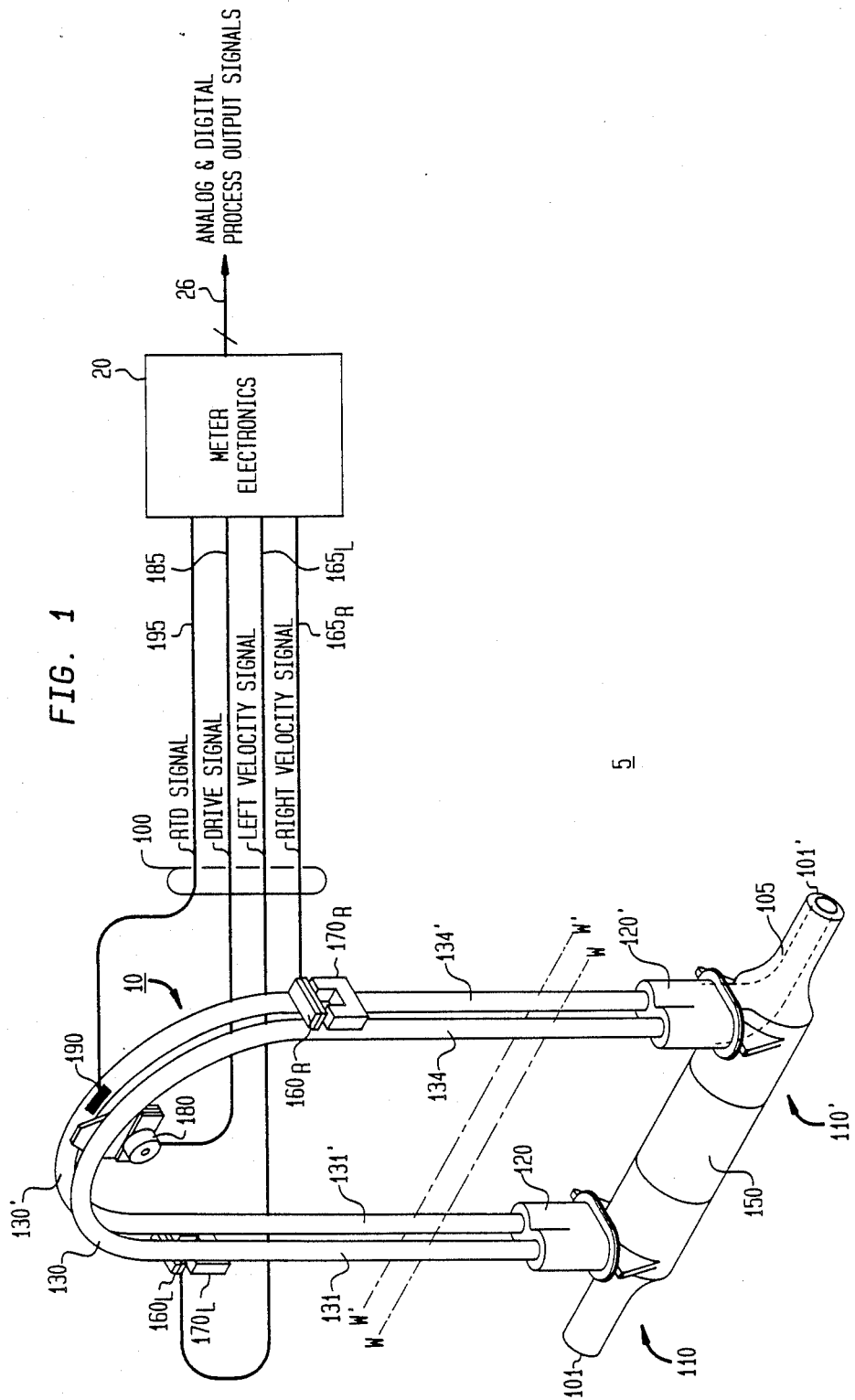
FIG. 1 is an overall diagram of Coriolis mass flow rate metering system 5.

FIG. 1 shows an overall diagram of Coriolis mass flow rate metering system 5.

As shown, system 5 consists of two basic components: Coriolis meter assembly 10 and meter electronics 20. Meter assembly 10 measures the mass flow rate of a desired process fluid. Meter electronics 20, connected to meter assembly 10 via leads 100, provides mass flow rate and totalized mass flow information. Mass flow rate information is provided over leads 26 in frequency form and in scaled pulse form. In addition, mass flow rate information is also provided in analog 4–20 mA form over leads 26 for easy connection to downstream process control and/or measurement equipment.

Coriolis meter assembly 10, as shown, includes a pair of manifolds 110 and 110'; tubular member 150; a pair of parallel flow conduits (tubes) 130 and 130'; drive mechanism 180; a pair of velocity sensing coils $160_L$ and $160_R$; and a pair of permanent magnets $170_L$ and $170_R$. Conduits 130 and 130' are substantially U-shaped and have their ends attached to conduit mounting blocks 120 and 120', which are in turn secured to respective manifolds 110 and 110'. Both flow conduits are free of pressure sensitive joints.

With the side legs of conduits 130 and 130' fixedly attached to conduit mounting blocks 120 and 120' and these blocks, in turn, fixedly attached to manifolds 110 and 110', as shown in FIG. 1, a continuous closed fluid path is provided through Coriolis meter assembly 10. Specifically, when meter 10 is connected, via inlet end 101 and outlet end 101', into a conduit system (not shown) which carries the fluid that is being measured, fluid enters the meter through an orifice in inlet end 101 of manifold 110 and is conducted through a passageway therein having a gradually changing cross-section to conduit mounting block 120. There, the fluid is divided and routed through flow conduits 130 and 130'. Upon exiting flow conduits 130 and 130', the fluid is recombined in a single stream within conduit mounting block 120' and is thereafter routed to manifold 110'. Within manifold 110', the fluid flows through a passageway having a similar gradually changing cross-section to that of manifold 110—as shown by dotted lines 105—to an orifice in outlet end 101'. At end 101, the fluid reenters the conduit system. Tubular member 150 does not conduct any fluid. Instead, this member serves to axially align manifolds 110 and 110' and maintain the spacing therebetween by a pre-determined amount so that these manifolds will readily receive mounting blocks 120 and 120' and flow conduits 130 and 130'.

U-shaped flow conduits 130 and 130' are selected and mounted so as to have substantially the same moments of inertia and spring constants about bending axes W-W and W'-W', respectively. These bending axes are perpendicularly oriented to the side legs of the U-shaped flow conduits and are located near respective conduit mounting blocks 120 and 120'. The U-shaped flow conduits extend outwardly from the mounting blocks in an essentially parallel fashion and have substantially equal moments of inertia and equal spring constants about their respective bending axes. Inasmuch as the spring constant of the conduits changes with temperature, resistive temperature detector (RTD) 190 (typically a platinum RTD device) is mounted to one of the flow conduits, here conduit 130', to continuously measure the temperature of the conduit. The temperature of the conduit and hence the voltage appearing across the RTD, for a given current passing therethrough, will be governed by the temperature of the fluid passing through the flow conduit. The temperature dependent voltage appearing across the RTD is used, as discussed in detail later, by meter electronics 20 to appropriately compensate the value of the spring constant for any changes in conduit temperature. The RTD is connected to meter electronics 20 by lead 195.

Both of these flow conduits are sinusoidally driven in opposite directions about their respective bending axes and at essentially their common resonant frequency. In this manner, both flow conduits will vibrate in the same manner as do the tines of a tuning fork. Drive mechanism 180 supplies the sinusoidal oscillatory driving forces to conduits 130 and 130'. This drive mechanism can consist of any one of many well known arrangements, such as a magnet and a coil through which an alternating current is passed, for sinusoidally vibrating both flow conduits at a common frequency. A suitable oscillatory drive signal, as discussed in detail below in conjunction with FIG. 5, is applied by meter electronics 20, via lead 185, to drive mechanism 180.

With fluid flowing through both conduits while these conduits are sinusoidally driven in opposite directions, Coriolis forces will be generated along adjacent side legs of each of flow conduits 130 and 130' but in opposite directions, i.e. the Coriolis force generated in side leg 131 will oppose that generated in side leg 131'. This phenomenon occurs because although the fluid flows through the flow conduits in essentially the same parallel direction, the angular velocity vectors for the oscillating flow conduits are situated in opposite though essentially parallel directions. Accordingly, during one-half of the oscillation cycle of both flow conduits, side legs 131 and 131' will be twisted closer together than the minimum distance occurring between these legs produced by just the oscillatory movement of the conduits generated by drive mechanism 180. During the next half-cycle, the generated Coriolis forces will twist the side legs 131 and 131' further apart than the maximum distance occurring between these legs produced by just the oscillatory movement of the conduits generated by drive mechanism 180.

During oscillation of the flow conduits, the adjacent side legs, which are forced closer together than their counterpart side legs, will reach the end point of their travel, where their velocity crosses zero, before their counterparts do. The time interval which elapses from the instant one pair of adjacent side legs reaches their end point of travel to the instant the counterpart pair of side legs, i.e. those forced further apart, reach their respective end point is proportional to the total mass flow rate of the fluid flowing through meter assembly 10. The reader is referred to U.S. Pat. No. 4,491,025 (issued to J. E. Smith et. al. on Jan. 1, 1985) for a more detailed discussion of the principles of operation of parallel path Coriolis flow meters than that just presented.

To measure the time interval, $\Delta t$, coils $160_L$ and $160_R$ are attached to either one of conduits 130 and 130' near their free ends and permanent magnets $170_L$ and $170_R$ are also attached near the free ends of the other one of the conduits. Magnets $170_L$ and $170_R$ are disposed so as to have coils $160_L$ and $160_R$ located in the volume of space that surrounds the respective permanent magnets and in which the magnetic flux fields are essentially uniform. With this configuration, the electrical signal outputs generated by coils $160_L$ and $160_R$ provide a velocity profile of the complete travel of the conduit and can be processed, as set forth in detail later, to determine the time interval and, in turn, the mass flow rate of the fluid passing through the meter. In particular, coils $160_L$ and $160_R$ produce the left and right velocity signals that appear on leads $165_L$ and $165_R$, respectively.

As noted, meter electronics 20 accepts as input the RTD signal appearing on lead 195, and left and right velocity signals appearing on leads $165_L$ and $165_R$, respectively. Meter electronics 20 also produces, as noted, the sinusoidal drive signal appearing on lead 185. Leads $165_L$, $165_R$, 185 and 195 are collectively referred to as leads 100. The meter electronics, as explained below, processes both the left and right velocity signal and the RTD temperature to determine the mass flow rate and totalized mass flow of the fluid passing through meter assembly 10. This mass flow rate is provided by meter electronics 20 on associated lines within leads 26 in analog 4–20 mA form. Mass flow rate information is also provided in frequency form (typically with a maximum range of 0–10 KHz), over an appropriate line within leads 26 for connection to downstream equipment.

Figure 2:
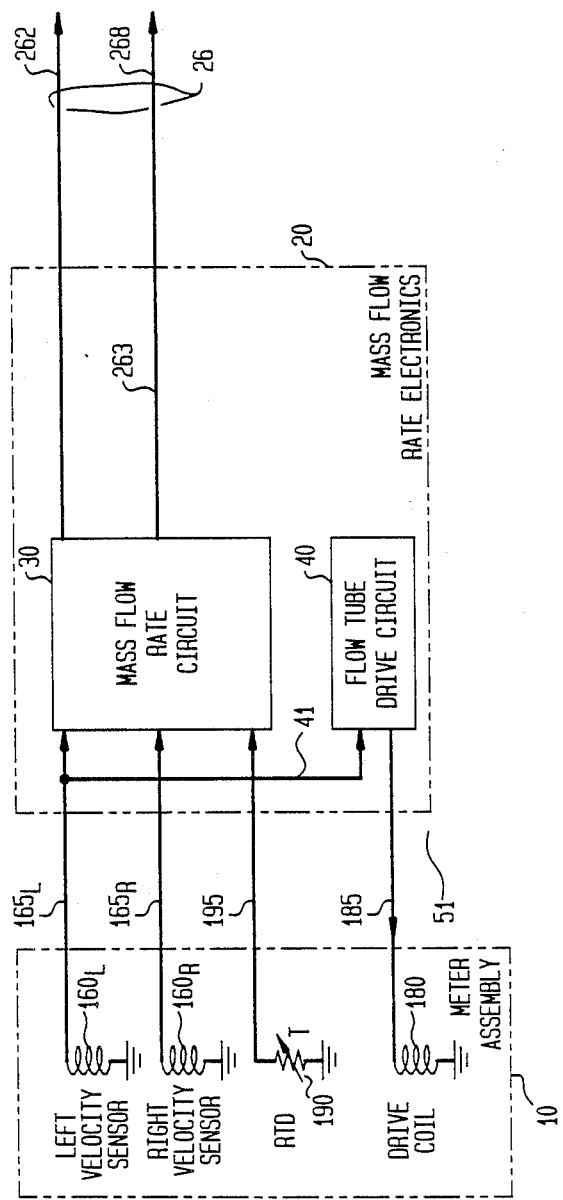
FIG. 2 depicts a block diagram of meter electronics 20 shown in FIG. 1.

A block diagram of meter electronics 20 is depicted in FIG. 2. Here, as shown, meter electronics 20 consists of mass flow rate circuit 30 and flow tube drive circuit 40.

Mass flow rate circuit 30 processes the left and right velocity signals appearing over leads $165_L$ and $165_R$, respectively, along with the RTD signal appearing on lead 195, as explained in detail below, to determine the mass flow rate of the fluid passing through meter assembly 10. The resulting mass flow rate information is provided as a 4–20 mA output signal over lead 268, for easy connection to additional process control equipment, and as a scaled frequency signal over lead 262 for easy connection to a remote totalizer. The signals appearing on leads 262 and 268 form part of the process signals that collectively appear on leads 26 shown in FIG. 1.

Flow tube drive circuit 40, depicted in FIG. 2, provides a sine wave drive signal, via lead 185, to drive drive mechanism 180. This circuit synchronizes the sine wave drive signal to the left velocity signal which appears on leads 165 and 41.

Figure 3:
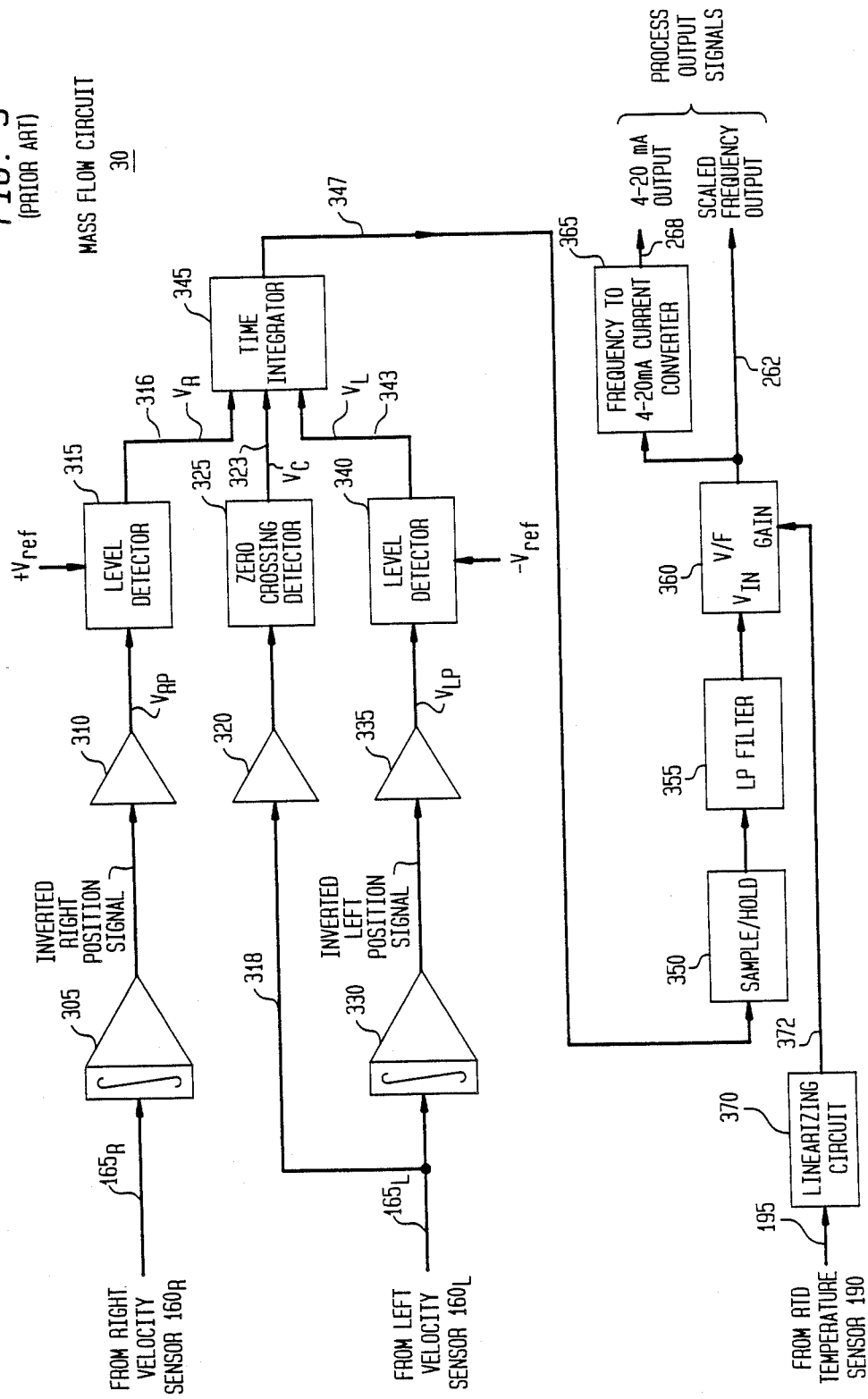
FIG. 3 is a block diagram of a prior art embodiment of mass flow rate circuit 30.
Figure 4A:
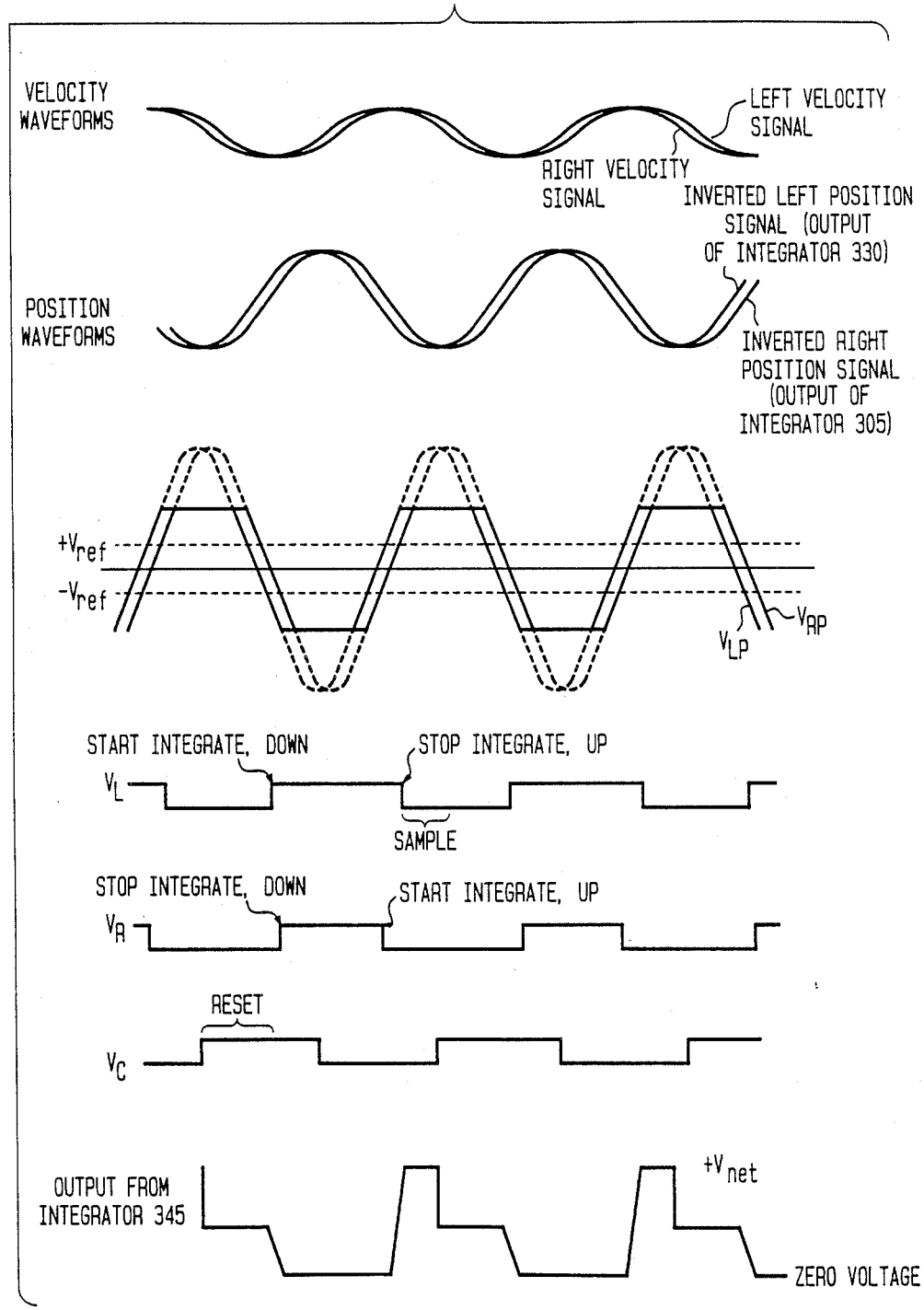
FIGS. 4A and 4B depict various waveforms present in the embodiment of mass flow rate circuit 30 shown in FIG. 3 for conditions of positive flow and no flow through meter assembly 10.
Figure 4B:
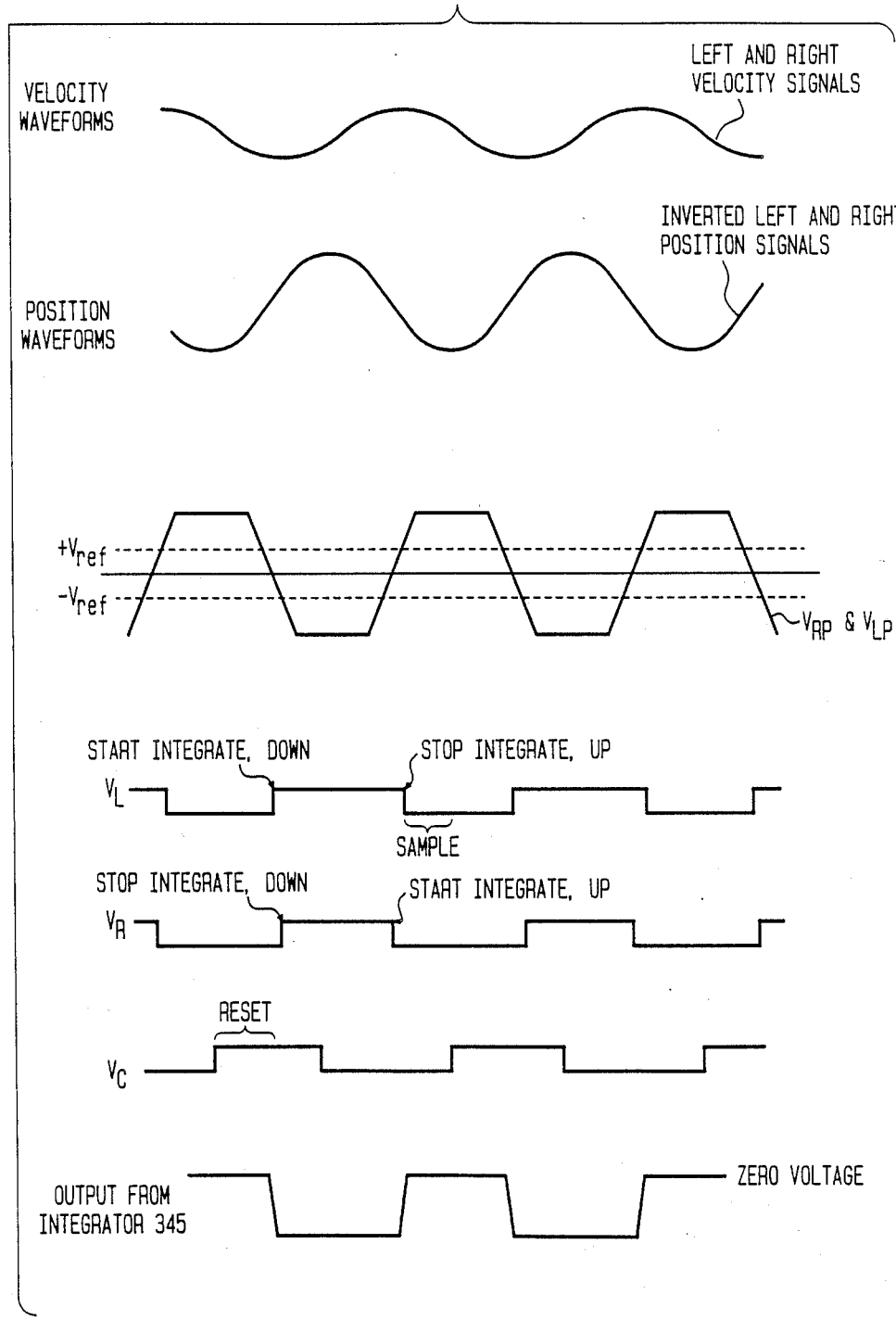

FIG. 3 depicts a block diagram of a prior art embodiment of mass flow rate circuit 30, shown in FIG. 2, with the corresponding waveforms generated by this circuit under conditions of positive flow through meter assembly 10 shown in FIG. 4A and no flow through the meter assembly shown in FIG. 4B. Here, incoming sinusoidal velocity signals from right and left velocity sensors $160_R$ and $160_L$, are applied via leads 165R and $165_L$, to integrators 305 and 330, respectively. With fluid flowing in a positive direction, i.e. into meter assembly 10 through inlet 101 (see FIG. 1), the Coriolis forces generated thereby will cause the right (outlet) side leg of flow conduit 130 to pass through its mid-plane of oscillation before the left (inlet) side leg of flow conduit 130 passes through its corresponding mid-plane of oscillation. As a result, the right velocity signal will lead the left velocity signal, as is evident in the velocity waveforms shown in FIG. 4A. This phase difference is linearly proportional to the mass flow rate of the fluid. As a result of the operation of integrators 305 and 330, as shown in FIG. 3 both velocity signals are shifted in phase by ninety degrees and inverted to yield the inverted left and right position signals. The output of integrators 305 and 330 are amplified and clipped by amplifiers 310 and 335, respectively. The resulting clipped left and right position signals, $V_{RP}$ and $V_{LP}$, are compared to respective positive and negative reference levels, $+V_{ref}$ and $-V_{ref}$, by level detectors 315 and 340. Time integrator 345 integrates the time difference existing between the output signals, $V_R$ and $V_L$, produced by level detectors 315 and 340 and appearing on leads 316 and 343, respectively. Reset signal $V_C$, appearing on lead 323, is used to reset integrator 345 and thereby define the point in time at which integration begins. Reset signal $V_C$ is formed by first applying the left velocity signal appearing on lead $165_L$ to amplifier 320 which amplifies and clips this signal and thereafter applying the resulting signal to zero crossing detector 325. Specifically, as illustrated in FIG. 4A, integrator 345 will reset itself during the time interval occurring between a rising edge on reset signal $V_C$ and a rising edge on signal $V_L$ (the reset condition). Thereafter, integrator 345 will negatively integrate the time period occurring between the rising edges on signals $V_L$ and $V_R$ and then positively integrate the time difference occurring between falling edges on signals $V_R$ and $V_L$. The output of integrator 345 is applied to sample and hold (S/H) circuit 350. This circuit samples the output voltage produced by the integrator after positive integration has ceased and before a reset condition has occurred. As a result, this circuit produces a value equivalent to the value of the sampled integrator output voltage. Thereafter, S/H circuit 350 maintains its output at this value during the remainder of the next integration cycle. For a positive flow, the output of S/H circuit 350 will track the net positive voltage $+V_{net}$ produced by integrator 345. This net positive voltage is proportional to the time difference between the velocity signals and hence to the mass flow rate. For flows occurring in the reverse direction, the Coriolis forces are reversed and the net integrator output voltage and that produced by the sample and hold circuit will be negative rather than positive. For conditions of no flow, as shown in FIG. 4B, the left and right velocity waveforms will be in phase as will be the inverted left and right position signals and voltages $V_{RP}$ and $V_{LP}$. Consequently, a zero valued net output voltage will be produced by integrator 345 immediately prior to the occurrence of a reset condition.

The output of sample and hold 350 (see FIG. 3) is smoothed by low pass filter 355 and thereafter applied to voltage-to-frequency converter 360. This converter is adjusted to produce a scaled frequency output on lead 262, typically 0–10,000 Hertz, which is proportional to the range of flow rates that can be measured using meter assembly 10. The signal produced by RTD temperature sensor 190 and appearing on lead 195 is used to vary the scaling of converter 360 for any temperature induced variations in the modulus of rigidity (sheer modulus) of the flow conduit. Specifically, the temperature signal is first linearized by circuit 370 to compensate for the non-linear characteristics of the RTD temperature sensor and thereafter applied over lead 372 to the GAIN input of converter 360. To produce a 4–20 mA analog output signal on lead 268, the frequency output appearing on lead 262 is applied to frequency to 4–20 mA converter 365.

I have observed that time interval measurements obtained through level detection techniques known in the art and typified by that used in mass flow measurement 30, discussed above in conjunction with FIGS. 2 and 3, contain components resulting from harmonics of the fundamental driving frequency of the flow conduit. These harmonics are frequently caused by non-linearities existing in the mechanical metering assembly itself and/or in the magnetic velocity sensors. Unfortunately, these harmonics disadvantageously inject error into the time interval measurements which, in turn, contaminate the velocity signal produced by either tube sensor. This error causes the phase shift occurring between the two flow conduit velocity sensor signals to disadvantageously change from its true value and hence adversely affect the overall accuracy of the meter. Specifically, these time delays appear as a phase difference between velocity sensor signals for each of the two flow conduits. Harmonics, particularly those having a non-zero value at zero crossings of the fundamental flow conduit driving frequency, impart an error component that resembles a phase shift to each velocity waveform. This error component can increase significantly as the phase relationship of a given harmonic to the fundamental driving frequency changes. For example, certain harmonics, such as the third harmonic, may not be noticeable at certain phase differences but become quite prevalent at other phase differences. Inasmuch as the phase shift attributable to mass flow rate is often a small value, then any harmonic content may inject a noticeable error component into measured phase shift and thereby into the measurement of the actual mass flow rate of the fluid as it travels through the meter. Consequently, the measured time difference will not only contain a true phase shift component attributable to actual mass flow rate but also an error component due to harmonic content. Of all the harmonics of the driving frequency, the second harmonic imparts the largest error component. Hence, mass flow rate measurements predicated on such time interval measurements will consequently contain an error component.

Accordingly, I have invented a technique to measure time interval $\Delta t$ in a manner that advantageously provides a mass flow rate signal that has a substantially reduced harmonic content over such signals appearing in Coriolis mass flow rate meters known in the art. This inventive technique, hereinafter referred to as the four pulse measurement technique and as discussed in detail below, relies on measuring the time interval that occurs between each of two measurement points situated on one, e.g. the right, position (or velocity) waveform and a reference point situated on the other, e.g. left, position (or velocity) waveform and which temporally occurs between each of the two measurement points.

Figure 5B:
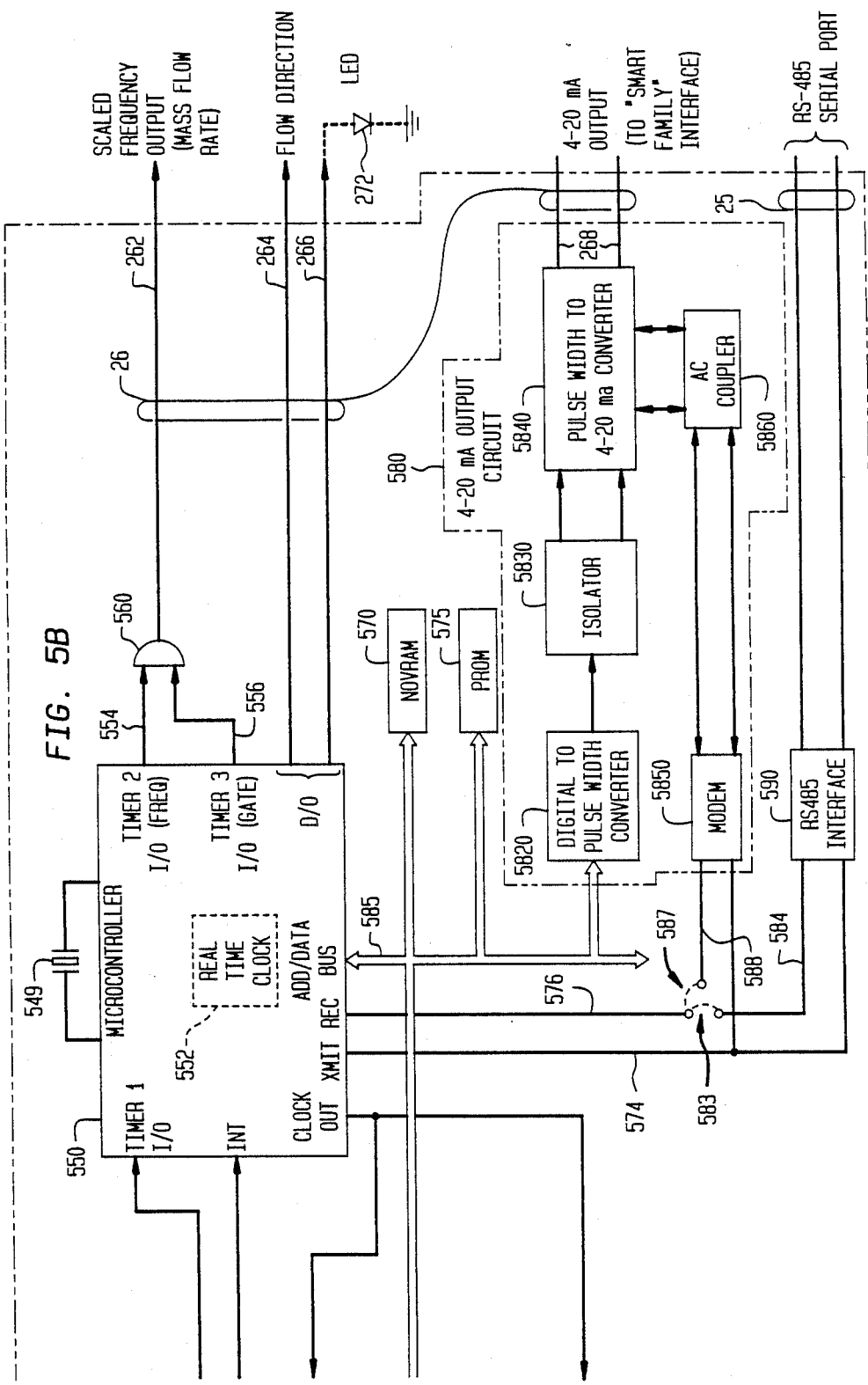

A block diagram of meter electronics 20 that utilizes the four pulse measurement technique is depicted in FIGS. 5A and 5B, for which the correct alignment of the drawing sheets for these figures is shown in FIG. 5. As shown, meter electronics 20 consist of mass flow rate measurement and flow totalization circuit 35 and flow tube drive circuit 40. Circuit 35 processes the left and right velocity signals appearing over leads $165_L$ and $165_R$, respectively, using the four pulse measurement technique along with the RTD signal appearing on lead 195, as explained in detail below, to determine the mass flow rate and totalized mass flow of the fluid passing through meter assembly 10. The resulting mass flow rate information is provided as a 4–20 mA output signal over leads 268, for easy connection to additional process control equipment, and as a scaled frequency signal over lead 262 for easy connection to a remote totalizer. The signals appearing on leads 262 and 268 form part of the process signals that collectively appear on leads 26 shown in FIG. 1.

Specifically, within mass flow measurement and flow totalization circuit 35, a 16-bit microcontroller, preferably model HPC36003 microcontroller from National Semiconductor of Santa Clara, Calif., forms the basis of meter electronics 20. Bi-directional address and data busses 585 link the microcontroller to four pulse measurement circuit 530, non-volatile random access memory (NOVRAM) 570, programmable read only memory (PROM) 575 and 4–20 mA output circuit 580. Appropriate clock signals are generated by microcontroller 550 using crystal 549 which typically has a resonant frequency of 16 MHz. In addition, the microcontroller contains real-time clock 552 to generate a stream of timing pulses. Each of these pulses, which occurs at intervals of 1/64 second, as described in detail below, causes a real-time clock interrupt routine to execute and update a timing value used to generate the scaled frequency output signal appearing on lead 262.

As noted, RTD 190 measures the temperature of flow conduit 130' (see FIG. 1). The value of the temperature is used by microcontroller 550 in compensating the value of the spring constant of the flow conduit for any temperature changes. Inasmuch as mass flow rate measurement does not contain any analog-to-digital (A/D) converters but uses timers, the voltage appearing across RTD 190 is routed, via lead 195, as shown in FIGS. 5A and 5B, to voltage-to-frequency (V/F) converter 545 which converts this voltage into an appropriate frequency within a pre-determined range. The resulting signal is applied via lead 547 to an input of a timer, specifically TIMER 1, on microcontroller 550. This timer counts the pulses appearing in this signal during a given period of time to produce a digital value proportional to the measured temperature. This value is periodically read by the program executing within the microcontroller.

Four pulse measurement circuit 530, as discussed in detail below, processes the velocity waveforms produced by right and left velocity sensors $160_R$ and $160_L$, respectively, to determine a digital up count and a digital down count which, when subtracted, provide a value of $\Delta t$. The value of both of these counts is read, via busses 585, through servicing of a tube period interrupt once during every two cycles of oscillatory movement of the flow conduits by the microcontroller. In servicing this interrupt, the microcontroller subtracts these values to yield a current measure of $\Delta t$ which is then used in determining the current value of mass flow rate.

Drive circuit 40 provides a sine wave drive signal, via lead 185, to drive drive coil 180. This circuit synchronizes the sine wave drive signal to the left velocity signal, specifically the amplified left velocity signal produced by amplifier 504 situated within four pulse measurement circuit 530.

NOVRAM 570 contains non-volatile random access memory for temporary data storage. This memory is illustratively implemented using integrated circuits containing battery backed up CMOS RAM circuits. New values of both constants and data are routinely written into the NOVRAM during program execution. PROM 575 contains program storage.

Output circuit 580 provides a specialized serial interface that modulates a carrier signal superimposed onto a 4–20 mA output signal. This output circuit contains digital to pulse width converter 5820, isolator 5830, pulse width to 4–20 mA converter 5840, modem 5850 and AC coupler 5860. The 4–20 mA signal itself provides a linear current value that is proportional to either the measured flow rate or density, as selected by the user, of the process fluid flowing through meter 10. To generate the 4–20 mA signal itself, microcontroller 550 loads an appropriate digital value, via busses 585, into digital to pulse width converter 5820. This converter produces a stream of pulses having an pulse width defined by the digital value. These pulses are transmitted through isolator 5830, typically optical, to pulse width to 4–20 mA converter 5840. In this manner, meter electronics 20 remain isolated from any hazardous voltages existing in downstream process control equipment. Converter 5840 produces a current signal for transmission over leads 268, that form part of leads 26, having a value between 4 and 20 mA inclusive that is proportional to the measured flow rate or density, as selected by the user during meter configuration. This current signal can be converted into a corresponding voltage signal by connecting an appropriately valued resistor, e.g. 250 ohms to yield 1–5 volts, across leads 268. Microcontroller 550 contains internal interfaces to accept bi-directional serial data. Outgoing serial data generated by the microcontroller appears at its transmit ("XMIT") output pin and is applied to lead 574 and from there to appropriate inputs of conventional RS-485 serial interface 590 and also to modem 5850 located within 4–20 mA output circuit 580. The modem converts the data into the HART protocol (HART is a trademark of Rosemount Inc.) which uses a frequency shift keyed (FSK) serial signal that is based upon type 202 Bell signalling. This signal is then routed to coupler 5860 which AC couples the FSK signal onto the 4–20 mA output signal.

The meter can be configured by placing a jumper in either position 583 or 587, as shown by dotted lines, to respectively receive serial data via RS-485 interface 590 or over the 4–20 mA signal. To receive incoming serial data appearing over the 4–20 mA signal, the jumper is placed in position 587 so that incoming serial data from modem 5850 is applied to microcontroller 550. Specifically, in this case, AC coupler 5860 routes an incoming FSK signal to modem 5850 which extracts the serial data therefrom. This data is then applied, via leads 588 and 576, to the receive ("REC") input pin of microcontroller 550. At a remote user location, a user merely taps into 4–20 mA signal at a convenient location using a device, effectively a hand held terminal with a suitable electrical interface, such as the model 268 "Smart Family" Interface currently manufactured by Rosemount Inc. of Eden Prairie, Minn. and can serially communicate on a bi-directional basis with meter electronics 20. Through this communication, the user is able to set various software switches and enter a variety of user parameters for subsequent use by the meter electronics and obtain information on any detected fault conditions that have occurred within the meter electronics. Incoming RS-485 serial signals appearing on leads 25 are routed to RS-485 interface 590 which, in turn, extracts serial data therefrom and applies this data to leads 584. Now, if a user sets the jumper into position 583, then incoming serial signals from RS-485 interface 590 can be directed, via leads 584 and 576, to the receive input pin of microcontroller 550.

Figure 7:
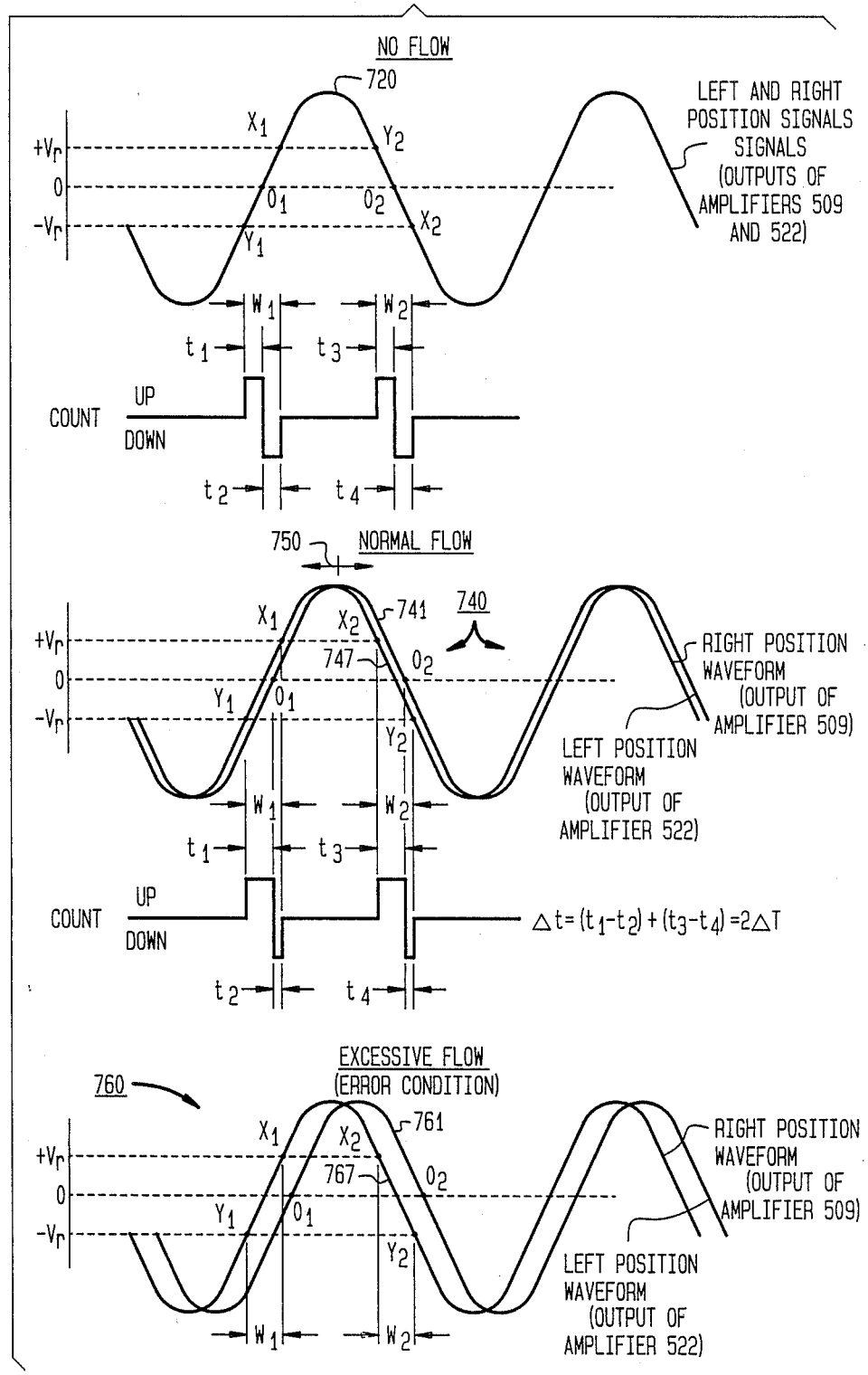
FIG. 7 graphically depicts the inventive four pulse measurement technique for measuring time interval $\Delta t$ using the left and right position waveforms shown in FIGS. 5A and 5B.

As noted above, $\Delta t$ measurements are made by measuring the time interval that occurs between each of two measurement points located on a rising side of one, e.g. the right, position (or velocity) waveform with respect to a reference point situated on the other, e.g. left, position (or velocity) waveform and which temporally occurs between each of the two measurement points. This is clearly seen in FIG. 7 which graphically depicts this technique. Time interval measurements are made between each pair of measurement points, $Y_1$ and $X_1$, and $Y_2$ and $X_2$ to form two measuring windows, $W_1$ and $W_2$, respectively. The width of each of these windows remains the same; however, the interval between each measurement point and its corresponding reference point linearly changes with changes in mass flow rate. On each cycle of flow conduit movement, time interval $\Delta t$ can be calculated from the following equation:

$$\Delta t = (t_1 - t_2) + (t_3 - t_4) \quad (1)$$

where: $t_1$, $t_2$, $t_3$ or $t_4$ respectively equal the intervals between measurement point $Y_1$ and reference point $O_1$, between reference point $O_1$ and measurement point $X_1$, between measurement point $X_2$ and reference point $O_2$, and between reference point $O_2$ and measurement point $Y_2$.

Since measurement points $X_1$ and $Y_2$ occur at the same measurement level, $+V_r$, and $Y_1$ and $X_2$ occur at the same measurement level, $-V_r$, then time intervals $(t_1 - t_2)$ equals $(t_3 - t_4)$. Hence, over one cycle of flow conduit movement:

$$\Delta t = 2(t_1 - t_2) = 2 \Delta T \quad (2)$$

Initially, for conditions of no flow, as depicted by waveform 720, when no phase difference appears between the right and left position waveforms, measurement points $Y_1$ and $X_1$, and $Y_2$ and $X_2$ must be symmetrically situated on either side of reference point $O_1$ and $O_2$, respectively. Here, the width of interval $t_1$ matches that of $t_2$. As such, $\Delta t$ equals zero, as expected. Now, as process fluid flows through meter assembly 10 (see FIG. 1), a phase difference, as shown in waveforms 740 in FIG. 7, appears between left and right position waveforms 741 and 747, respectively, which is proportional to the mass flow rate of the process fluid. For positive flow, as shown, through the meter assembly, this phase difference causes the width of interval $t_1$ to exceed that of interval $t_2$. Similarly, for negative flow, the phase difference causes the width of interval $t_2$ to exceed that of interval $t_1$. The difference in width of these intervals, i.e. $t_1 - t_2$, is proportional to the mass flow rate. As the mass flow rate increases or decreases, the phase difference will change as shown by arrow 750 which, in turn, correspondingly changes the value of difference of these intervals. In the event excessive flow occurs, such as shown in waveforms 760, where a reference point, $O_1$ or $O_2$ on left position waveform 761, is situated outside windows $W_1$ or $W_2$ formed by measurement points $Y_1$ and $X_1$, and $X_2$ and $Y_2$ located on right position waveform 767, respectively, then an error condition exists. In this instance, time interval $\Delta t$ can not be measured. As such, the microcontroller will provide an appropriate fault indication, as discussed below, to notify the user.

The location of measurement points $X_1$, $Y_1$, $X_2$ and $Y_2$ on the right position waveform is established by reference voltages $\pm V_r$. Reference points $O_1$ and $O_2$ are taken to be the zero crossings of the left position waveform. From equations (1) and (2), it is evident that the sensitivity of the $\Delta t$ measurement can be increased by increasing the number of equal sized windows that are used to measure time intervals. For example, if three equal timing intervals were used during any one cycle of flow conduit movement, then $\Delta t$ would equal $3 \Delta T$, and so on for additional intervals.

Separate counters are used to measure the duration of intervals $t_1$ and $t_3$, and $t_2$ and $t_4$. Specifically, as shown in FIGS. 5A and 5B, one counter (the "up" counter), specifically (divide-by-four) pre-scaling counter 526 and 16-bit counter C1 located within counters 534, measures time intervals $t_1$ and $t_3$ (the "up" intervals). Another counter (the "down" counter), specifically (divide-by-four) pre-scaling counter 528 and 16-bit counter C2 also situated within counters 534, measures time intervals $t_2$ and $t_4$ (the "down" intervals). To provide sufficient accuracy, these counters are incremented at the clock frequency produced by crystal 549, typically 16 MHz. The counters are not reset between the rising and falling sides of each cycle of the position waveform but are allowed to continue accumulating during measuring intervals occurring over a total of two adjacent cycles of these waveforms before being read. As such, time interval measurements are made using a set of two measurement points situated on both the rising and falling side of each of two cycles of the right position waveform and a reference point temporally located therebetween on the left position waveform. Once both these cycles have occurred, then a Δt measurement is calculated by the microcontroller by simply subtracting the total count stored within the "DOWN" counter from that existing within the "UP" counter. Advantageously, empirical observations show that measuring Δt in this way provides substantial reductions in the amounts of even harmonics present in the measured Δt values over those produced through conventional analog lead detection techniques known in the art and typified by that shown in FIGS. 2–3. Furthermore, I have observed that the value of reference voltage $V_r$ can be appropriately selected to effect substantial reductions in a particular harmonic. Specifically, as the magnitude of voltage $V_r$ is increased, an increasingly lower odd order harmonic can be substantially removed. Likewise, as the magnitude of voltage $V_r$ is decreased, a higher order odd harmonic can be substantially removed. For example, the magnitude of voltage $V_r$ can be set to a relatively large value that removes substantially all of the third harmonic of the driving frequency or reduced to a relatively low value that removes substantially all of the fifteenth harmonic of the driving frequency. Consequently, the mass flow rate values, and hence the totalized flow values, produced by microcontroller 550 contain substantially less error than heretofore possible using techniques currently known in the art. In addition, multiple harmonics might be removed from the Δt measurement by utilizing time measurements from more than two different windows each with different values of reference voltage $V_r$ and then appropriately combining the these measurements.

Figure 6:
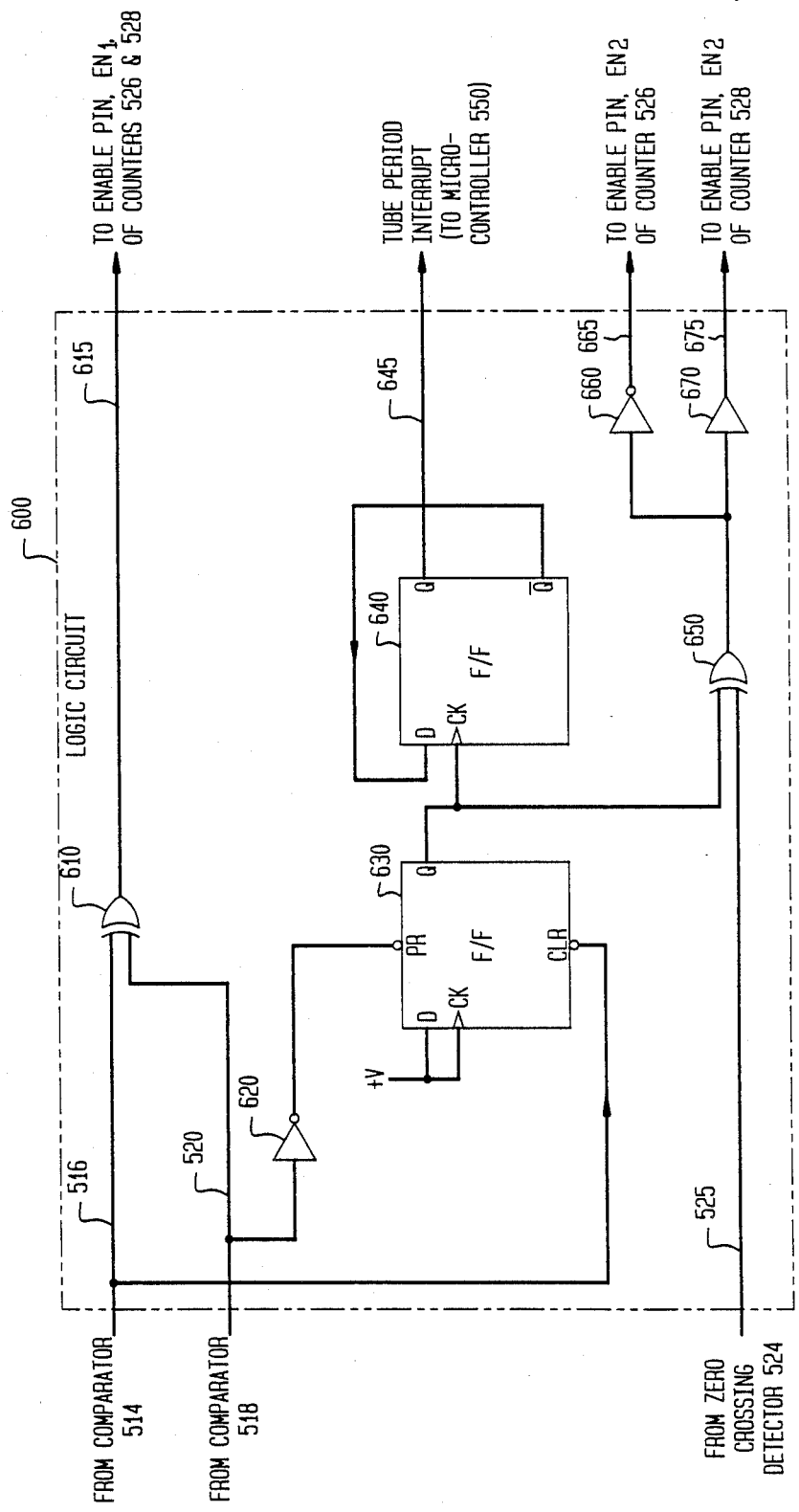
FIG. 6 is a block diagram of logic circuit 600 shown in FIGS. 5A and 5B.

Now, with this description of the four pulse measurement technique in mind, the discussion will now turn to a description of four pulse measurement circuit 530 as shown in FIGS. 5A and 5B. Velocity waveforms produced by right and left velocity sensors $160_R$ and $160_L$ are routed by leads $165_R$ and $165_L$, respectively, to amplifiers 502 and 504 which impart appropriate gain, typically ten, to these signals. The resulting amplified right and left sensor signals are routed to precision integrators 508 and 510 which impart a ninety degree shift to each of these signals, in effect converting each into a position signal. This integration is used primarily to provide filtering to remove noise and other high frequency artifacts from each velocity signal. The integrated waveforms are then applied to saturating amplifiers 509 and 522 which amplify these signals and clip the positive and negative levels of the resulting signals to ±10 volts to prevent comparators 514, 520 and 524 situated downstream of these integrators from being driven into saturation. As noted, the reference point (points $O_1$ and $O_2$ shown in FIG. 7) on both the rising and falling sides on the left velocity sensor waveform is conveniently chosen to be the zero crossing point of the corresponding position waveform. Any other point on the left velocity (or position) waveform can be chosen as the reference point as long as the associated measurement points (points $X_1$, $Y_1$, $X_2$ and $Y_2$ shown in FIG. 7) are symmetrically situated about this reference point at a zero flow condition. As such, as shown in FIGS. 5A and 5B, comparator 524 changes its output state on lead 525 at the occurrence of each reference point (zero crossing). The measurement points are taken to be symmetric voltages, $\pm V_r$, illustratively ±4 volts, about zero. Comparators 514 and 518 are used to detect the occurrence of each measurement point on the right position waveform by applying a high level to corresponding leads 516 or 520. The signals appearing on leads 516, 520 and 525 are routed to logic circuit 600 which through simple combinatorial gating, as shown in FIG. 6 and discussed in detail below, generates a pulse on lead 645 every two tube cycles that serves as the tube period interrupt and, as shown in FIGS. 5A and 5B, appropriate enable signals to counters 526 and 528 that form part of the up and down counters. In particular, counters 526 and 528 are clocked by 16 MHz clock pulses appearing on clock leads 536. Each of these counters contains two enable inputs, En1 and En2, that must both be high in order for the counters to increment. In response to the comparator outputs, logic circuit 600 generates a high level pulse on lead 615 to the En1 inputs of both counters whenever the first measurement pulse has occurred. This high level continues throughout the entire timing interval, i.e. to the occurrence of the second measurement pulse. Thereafter, depending upon which specific counter is to be incremented during a timing interval (i.e. between the first measurement point, e.g. $Y_1$, and the reference point, e.g. $O_1$, or between that reference point and the second measurement point, e.g. $X_1$), logic circuit 600 will provide a high level on either lead 665 or 675 to the En2 input of counter 526 or 528, respectively, to cause only that counter to increment during that interval. Since counters 534 typically can not be clocked at the same high rate as counters 526 and 528, these latter two counters serve as divide-by-four pre-scalers. As such, the overflow output of counters 526 and 528 are routed to the clock inputs, Ck1 and Ck2, of separate 16-bit counters C1 and C2 situated within counters 534. Counters C1 and C2 are connected to bus 585. As such, at the occurrence of every interrupt on lead 645, microcontroller 550 reads the contents of both of these counters. As noted below, these counters are not cleared but instead are allowed to roll over with the values of these counters occurring at the conclusion of the immediately prior set of two adjacent conduit cycles being subtracted by the microcontroller from the values that occurred at the conclusion of the present set to yield the appropriate counts.

A block diagram of logic circuit 600 is depicted in FIG. 6. The outputs of comparators 514 and 518 define the beginning and end of a Δt measuring interval, i.e. the occurrence of first and second measurement points ($\pm V_r$ values) on the right velocity sensor waveform that sandwich a corresponding reference point (zero crossings) on the left velocity sensor waveform. As depicted, these outputs are routed over leads 516 and 520 to corresponding inputs of exclusive OR gate 610 which, in turn, provides a high level within each measuring interval, on lead 615 that is routed to the first enable, En1, input of counters 526 and 528 in measurement circuit 530. In addition, the output of comparator 518 present on lead 520 is used to preset, via inverter 620, flip flop 630 while the output of comparator 514 present on lead 516 clears this flip flop. The true, Q, output of flip flop 630 is fed to the clock input of flip flop 640 which merely acts to divide this output by two. The resulting divided output, which has a pulse rate of once every two tube cycles, is applied over lead 645 to microcontroller 550 as the tube period interrupt. To generate the second enable signals, En2, to counters 526 and 528, the output of comparator 524 is routed via lead 525 to one input of exclusive OR gate 650. The other input to this gate is the signal at the true output of flip flop 630. As such, this gate produces a high level during the first portion of each measuring interval, i.e. after the occurrence of every first measuring point (e.g. points $Y_1$ and $X_2$ shown in FIG. 7) and before its associated zero crossing point, and a low level during the second portion of each measuring interval, i.e. after the occurrence of each reference (zero crossing) point (points $O_1$ and $O_2$ shown in FIG. 7) and before the occurrence of its associated second measuring point (e.g. points $X_1$ and $Y_2$ shown in FIG. 7). As shown in FIG. 6, the output of gate 650 is applied through inverter 660 to lead 665 as the En2 enable signal to counter 526 and through buffer 670 to lead 675 as the En2 enable signal to counter 528.

As shown in FIGS. 5A and 5B, meter electronics 20 also provides three digital process output signals on leads 26: scaled frequency output pulses on lead 262, a level on lead 264 to indicate flow direction and a low frequency signal on lead 266 to pulse remotely mounted light emitting diode (LED) 272 at a rate of 1 Hz to indicate normal operation or at a rate of 4 Hz to indicate the detection of a fault condition. Separate single bit digital outputs available on microcontroller 550 are used to provide the appropriate signals on leads 264 and 266.

Figure 11:
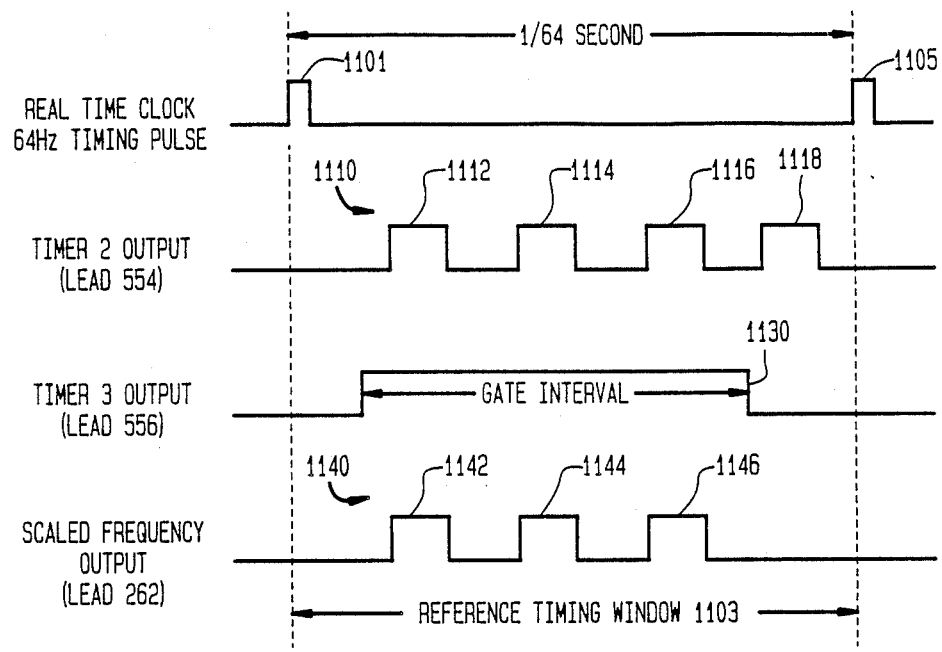
FIG. 11 is a diagram showing illustrative waveforms used in producing the Scaled Frequency Output Signal appearing on lead 262 shown in FIGS 5A and 5B.

Specifically, the scaled frequency output is generated through a gated combination of two timer output signals. Each pulse appearing on the scaled frequency output, i.e. lead 262, represents that a user selected amount of fluid, e.g. one ounce or one gram, has flowed through the meter in a user defined interval of time, such as one second. Now, to facilitate understanding, the reader should simultaneously refer to both FIGS. 5A, 5B and 11 for the following discussion. FIG. 11 shows illustrative waveforms used in producing the scaled frequency output signal. These timers, TIMER2 and TIMER3, are internal to the microcontroller. The occurrence of every 64 Hz interrupt defines the beginning of every 1/64 second timing interval by a pulse, such as pulse 1101 or 1105, generated by real-time clock 552 located within microcontroller 550. The timing interval is used to define, as discussed below, reference timing window 1103 which is typically 1/64 second (as shown) but for low flow rates can be also be 1/32 second or even 1/16 second. During servicing of the 64 Hz interrupt, as discussed in detail below, the internally totalized mass flow is updated. The internally totalized mass flow value is maintained to a 32 bit resolution with the upper 8 bits constituting one portion and the remaining 24 bits constituting a second portion ("remainder"). Essentially, once the update operation has been performed, the value of the upper 8 bit portion is used as an address to a look up table which provides current "frequency" and "gate" values to load into timers TIMER2 and TIMER3, respectively. The "frequency" value loaded into timer TIMER2 when counted down by the timer operating at the microcontroller clock frequency (16 MHz) during the next immediately occurring timing reference window, generally 1/64 second, provides the "ON" time for each output pulse to be produced by that timer during that interval. The "ON" time is set to provide a sequence containing the desired number of square pulses, i.e. each pulse having a 50% duty cycle, during the timing cycle, such as pulses 1112, 1114 and 1116. Once the timer is loaded with a value, it is merely instructed to run and produce pulses on lead 554 until the timer, is updated again during the next reference timing window. Unfortunately, due to the occurrence of nested interrupt servicing which may occur from time to time, timer TIMER2 may not necessarily be updated at the appropriate point during the start of the next successive reference timing window but rather somewhat later. Timer TIMER2 will still be producing pulses during this time. Consequently, to advantageously prevent any additional, i.e. extraneous, pulses, such as pulse 1118, produced by this timer from corrupting the scaled frequency output signal and causing the value of an externally totalized mass flow from diverging from an internally totalized mass flow rate value maintained by microcontroller 550, the "gate" value is loaded into timer TIMER3 essentially simultaneously with the "frequency" value being loaded into timer TIMER2. Once this occurs, both timers are instructed to begin counting and produce respective output signals that both start, at the beginning of a reference timing window, from one logic state (either high or low) and end, at the conclusion of the window, in one logic state (either high or low). An erroneous output occurs if the outputs of both timers are in opposite or different logic states at the end of any such window. Logic circuitry (not shown) could be fabricated to test for this error condition and appropriately inform microcontroller 550 of its occurrence. Use of this circuitry might be useful in very high accuracy metering applications such as in custody transfers. In any event, as shown, the "gate" value defines an interval of time, an "ON" time, which will last from the beginning of the first frequency output pulse to be generated in the timing reference window and run approximately hal way through the low level portion of the last frequency output pulse to be produced during that window. As such, the output, e.g. pulse 1130, produced by timer TIMER3 and appearing on lead 556 is a high level during this time. The signals appearing on leads 554 and 556 are then applied to corresponding inputs of AND gate 560 which gates only the correct number of square pulses, e.g. pulses 1142, 1144 and 1146, through as the scaled frequency output signal appearing on lead 262. Accordingly, the scaled frequency output signal can be viewed as an "absolute" frequency output signal. Consequently, inasmuch as the remainder of the accumulated mass flow is always maintained, particularly to a 24 bit resolution, and only the proper ("absolute") number of square output frequency pulses are produced during any timing reference window, the internally and externally totalized counts will advantageously not substantially diverge over time.

B. Software

The software executed by microcontroller 550 essentially consists of Main Loop 800 and two interrupt service routines: 64 Hz Interrupt Routine 900 and Tube Period Interrupt Routine 1000. Main Loop 800 performs initialization and then waits for either an interrupt to occur or a user to signal the meter to enter a configuration mode in order to change a user selectable value. 64 Hz Interrupt Routine 900 is executed every time a 64 Hz timing pulse occurs to read the up and down counters and update the measured mass flow rate value. Tube Period Interrupt Routine 1000 is executed once every two cycles of flow conduit (tube) movement to update the scaled frequency output.

Figure 8B:
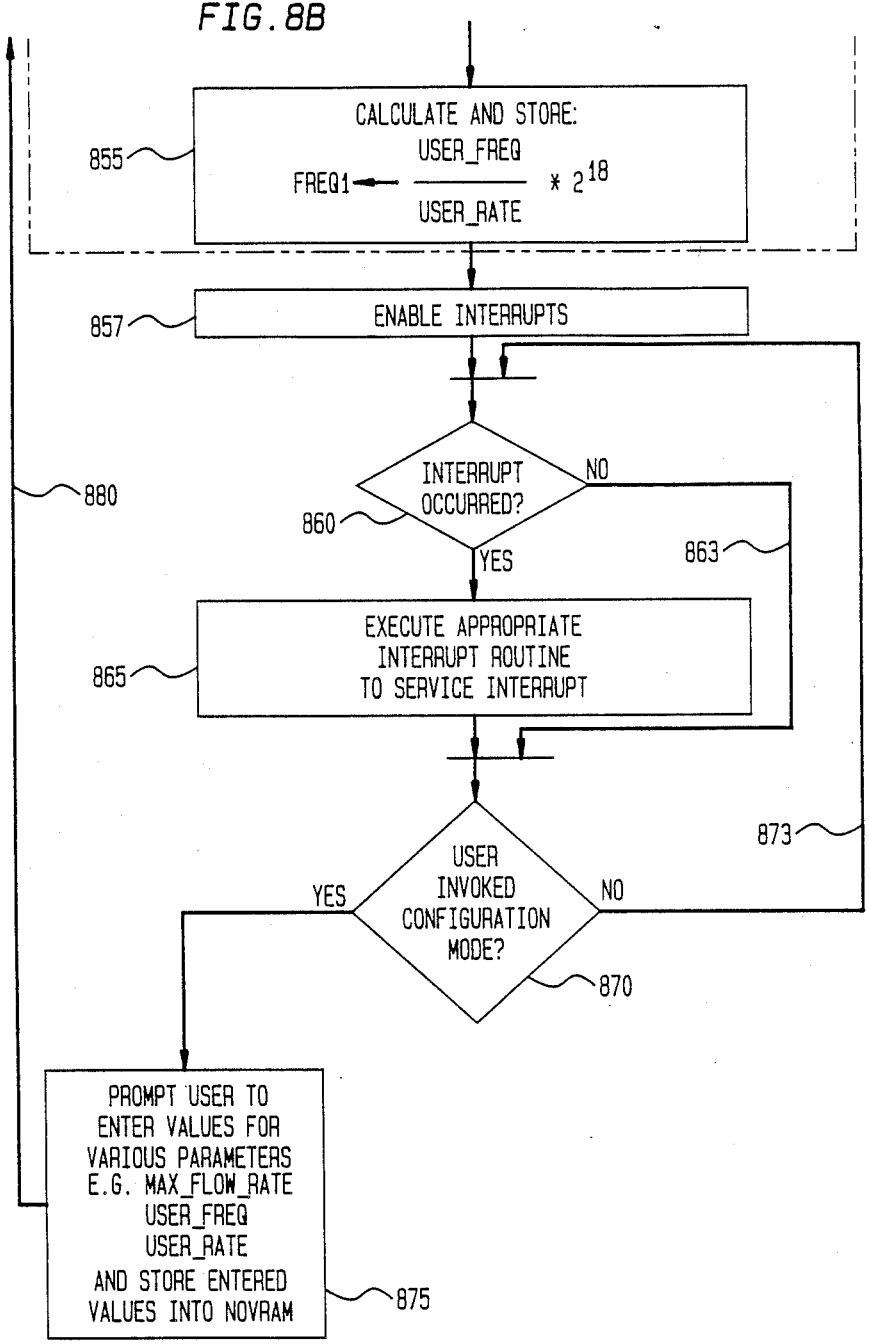

Main Loop 800 is collectively shown in FIGS. 8A and 8B, for which the correct alignment of the drawing sheets for these figures is depicted in FIG. 8.

Specifically, upon entry into Main Loop 800, which generally occurs during a power-on reset condition, execution first proceeds to initialization routine 810. Within this routine, block 813 first executes to disable all interrupts. Thereafter, block 815 is executed to perform various hardware initialization steps and various software based diagnostics. Once this occurs, block 818 is executed to set various software variables to their initial values. These variables include: SLONG1, SLONG2, OLD_DELTA_T and NEXT_DELTA_T that are used within routine 1000, as discussed below. Thereafter, block 820 is executed to load default values for various parameters from NOVRAM in the event software initialization has not previously occurred, such as during system start-up after an occurrence of a power on reset. If software initialization has occurred, then previously entered user selected values for these parameters will be used in lieu of the corresponding default values. Execution then proceeds to block 825 which calculates and stores the expected maximum output frequency (MAX_FREQ) that should occur at the maximum flow rate. Thereafter, execution proceeds to block 830 which initializes a counter, DIVIDE_DOWN, to zero. This counter is used in counting timing intervals in the event low flow rates are to be measured. Decision blocks 835 and 845 are then executed to determine whether low flow rates are to be measured and, if so, to set a counter to define the appropriate update interval. Specifically, if the value of MAX_FREQ is less than "16", then decision block 835 routes execution, via its YES path, to block 840 which, when executed, sets the value of counter DIVIDE_DOWN to one, thereby providing an update interval of 1/32 second for the scaled frequency output. Execution then proceeds to decision block 845. Alternatively, if the value of MAX_FREQ is greater than or equal to "16", then execution proceeds, via NO path 838, to decision block 845. This decision block, when executed, determines whether the value of MAX_FREQ is less than "8". If it is, then execution proceeds, via the YES path emanating from decision block 845, to block 850 which, when executed, sets the value of counter "DIVIDE_DOWN" to two, thereby providing an update interval equal to 1/16 second for the scaled frequency output. Execution then proceeds to block 855. Alternatively, if the value of MAX_FREQ is greater than or equal to "8", then execution proceeds, via NO path 848, to decision block 855. Block 855, when executed, calculates and stores the value of variable FREQ1 which, as discussed below, subsequently serves as a scale factor that will be multiplied by the flow rate to determine the appropriate number of scaled frequency output pulses to provide during an update interval. Once block 855 executes, execution of initialization routine 810 has concluded.

At this point, main loop 800 waits for either interrupts or user entry into a configuration mode to occur. Specifically, execution proceeds to block 857 to enable all interrupts. Thereafter, execution proceeds to decision block 860. In the event an interrupt occurs, then execution proceeds to block 865, via the YES path emanating from this decision block. Block 865, when executed, executes the appropriate interrupt service routine (64 Hz Interrupt Service Routine 900 or Tube Period Interrupt Routine 1000) to service the interrupt. Once this has occurred or in the event no interrupt has just occurred in which case decision block 860 routes execution to NO path 863, then execution proceeds to decision block 870. This decision block determines whether the user has requested to change the configuration of the meter. If the user has made this request, such as through depressing an appropriate key on the external terminal, then decision block 870 routes execution, via its YES path, to block 875. This block, when executed, prompts the user through a pre-defined menu, accessible through the serial port and external terminal equipment (such as the model 268 "Smart Family" Interface discussed above), to enter user selectable values of various parameters. These parameters include a maximum flow rate (MAX_FLOW_RATE) that will be measured, a user selected maximum frequency, e.g. 10 kHz, (USER_FREQ) that is to be generated on the scaled frequency output and a user selected flow rate (USER_RATE) that corresponds to this frequency. Thereafter, execution loops back, via path 880, to the entry point of initialization routine 810. Alternatively, if the user has not made such a request, then decision block 870 routes execution, via NO path 873, back to decision block 860 to wait for an interrupt to occur. Although the loop containing decision block 860 and execution block 865 is generally not explicitly programmed but is rather hardwired within the microcontroller itself, this loop is used to facilitate understanding by diagrammatically depicting the interrupt servicing process.

Figure 9B:
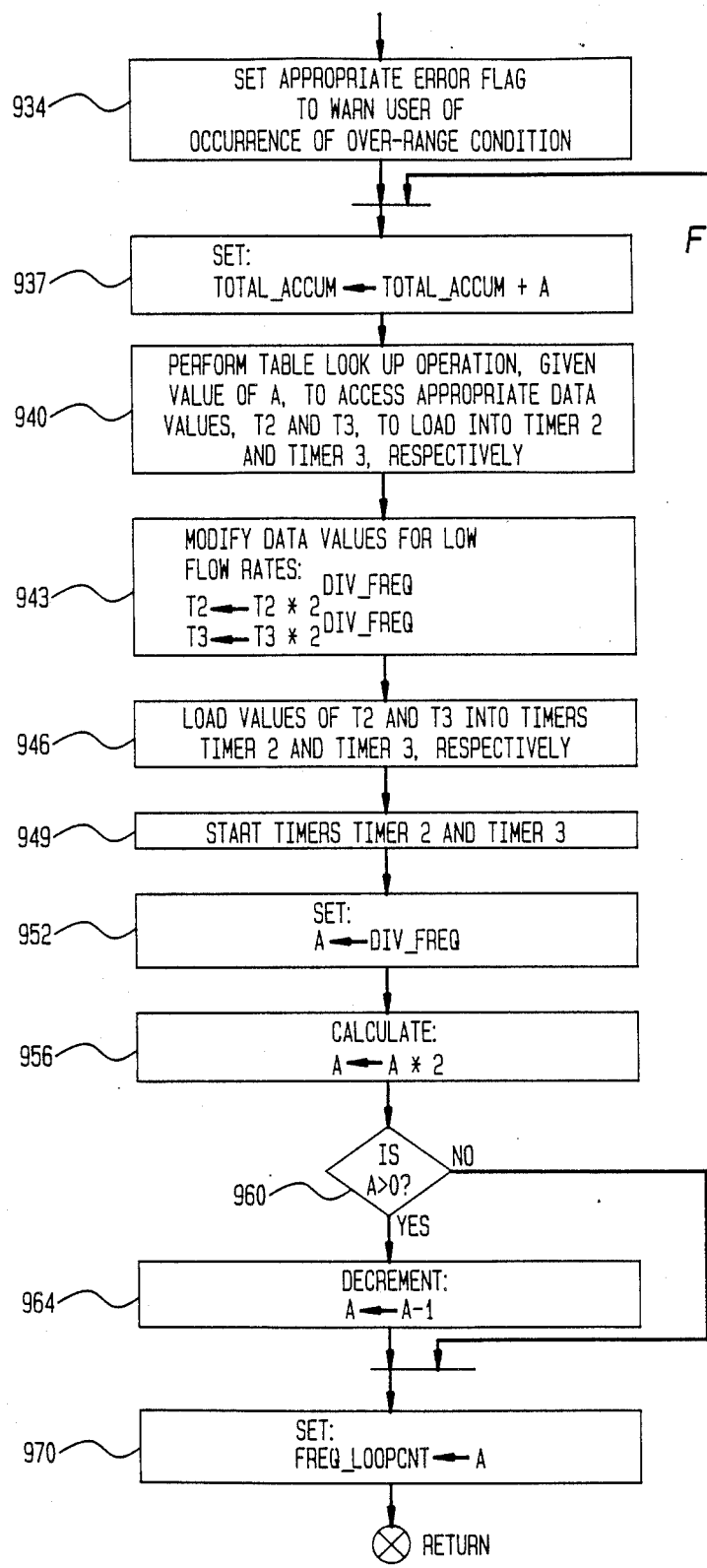

A flowchart of 64 Hz Interrupt Routine 900, that is executed as part of Main Loop 800, is collectively shown in FIGS. 9A and 9B, for which the correct alignment of the drawing sheets for these figures is shown in FIG. 9. As noted, 64 Hz Interrupt Routine 900 is executed every time a 64 Hz timing pulse occurs to read the up and down counters and update the measured mass flow rate value.

Specifically, upon entry into routine 900, execution proceeds to block 903 which reads the value of internally totalized mass flow (PULSE_ACCUM) from NOVRAM 570 (see FIGS. 5A and 5B). Thereafter, as shown in FIGS. 9A and 9B, execution proceeds to block 906 which updates a value of totalized mass flow, maintained in terms of scaled frequency output pulses, given the latest measured mass flow rate value (RATE) occurring during the immediately prior timing interval. This mass flow rate value is multiplied by the value of scale factor FREQ1, that has been determined during initialization, to determine the number of pulses that need to be added. The resulting updated value is then stored back in NOVRAM 570. Once this occurs, execution proceeds to block 909 to store the value of counter DIVIDE_DOWN into temporary variable DIV_FREQ. Thereafter, execution proceeds to decision block 912 to determine, for low maximum flow rates where 1/32 and 1/16 second timing intervals are used, whether updating of the frequency output should occur in the present 1/64 second timing interval. In the event the contents of loop counter FREQ_LOOPCNT is not zero thereby indicating that no such updating will occur during the current interval, then decision block 912 routes execution, via its NO path, to block 915 which merely decrements the value of counter FREQ_LOOPCNT by one. Thereafter, execution returns from routine 900. Alternatively, if the contents of FREQ_LOOPCNT equal zero thereby indicating that updating should occur, then decision block 912 routes execution, via its YES path, to block 918. This block, when executed, stops timers TIMER2 and TIMER3 which provide the frequency and gate outputs from microcontroller 550 (see FIGS. 5A and 5B). Once this occurs, as shown in FIGS. 9A and 9B, execution proceeds to block 922 which, when executed, reads the upper byte of the variable PULSE_ACCUM and stores the result in temporary variable A. Next, execution proceeds to decision block 925 to determine whether the value of A exceeds "180" which is a pre-defined maximum number of square pulses that can be produced in a reference timing window. Specifically, most frequency outputs in commercial equipment have a maximum output frequency of approximately 10 kHz. Hence, the maximum value of variable A is sized to provide a compatible maximum frequency for the scaled frequency output. Accordingly, with the value of variable A at "180", the maximum number of output pulses/second using a 1/64 second reference timing window is 180 * 64 or 11,520 pulses. With a reference timing window having a duration of either 1/32 or 1/16 second, the maximum number of output pulses/second is 180 * 32 or 5,760 pulses, or 180 * 16 or 2,880 pulses, respectively. Now, in the event the value of "A" exceeds "180", then decision block 925 routes execution, via its YES path, to block 931 which, when executed, sets the value of A to "180". Execution then proceeds to block 934 which sets an appropriate error flag to warn the user of the occurrence of an over-range condition. Execution then proceeds to block 937. Alternatively, if the value of A equals or is less than "180", then decision block 925 routes execution, via its NO path, directly to block 937. Block 937, when executed, updates the value of a totalizer, TOTAL_ACCUM, that maintains a running totalization of the actual number of pulses that have been generated with the latest number, A, of pulses that are to be generated during the current timing interval. Once this occurs, execution proceeds to block 940 which uses the value of variable A as an address into a look-up table stored in PROM 575 (see FIGS. 5A and 5B) to access the corresponding values, T2 and T3, that will be loaded into "frequency" timer TIMER2 and "gate" timer TIMER3. Next, as shown in FIGS. 9A and 9B, block 943 is executed to modify the values T2 and T3 for low flow rates by shifting these values to the left a number of positions equal to the value of variable DIV_FREQ. For flow rates producing more than 16 pulses per second, the value of DIV_FREQ is zero. Thereafter, execution proceeds to block 946 which, when executed, loads the values T2 and T3 into timers TIMER2 and TIMER3, respectively. Once this occurs, block 949 is executed to start both of these timers. Thereafter, execution proceeds to block 952. Blocks 952-970 are used to set the appropriate value of the loop counter, FREQ_LOOPCNT. In particular, block 952, when executed, stores the value of DIV_FREQ into temporary variable A. Block 956 is then executed to multiply the value of variable A (the value DIV_FREQ) by two. Thereafter, execution proceeds to decision block 960 which tests whether variable A has a value greater than zero. If the value of variable A is greater than zero thereby indicative of a low flow rate requiring a 1/32 or 1/16 reference timing window, then execution proceeds, via the YES path emanating from decision block 960, to block 964. This latter block decrements the value of variable A by one. Execution then proceeds to block 970 which, when executed, stores the resulting value in variable A into the loop counter, FREQ_LOOPCNT, for subsequent use. Alternatively, if the value of variable A is equal to zero, then decision block 960 merely routes execution via its NO path directly to block 970. Once block 970 has executed, execution returns from routine 900 back to main loop 800. Thus, it can be see that the number of pulses produced on the scaled frequency output can vary from one reference timing window to the next based upon the then current value of the non-remainder portion (upper byte) of the totalized mass flow variable, PULSE_ACCUM. For example, one 1/64 second reference timing window may have five pulses, the next four pulses, the following one or zero pulses and so on. However, by the time one second has elapsed, the number of pulses generated over 64 adjacent windows will be equal to the absolute number of pulses required thereby ensuring that the internally and externally generated totalized mass flow values will not substantially diverge, if at all, over time.

Figure 10B:
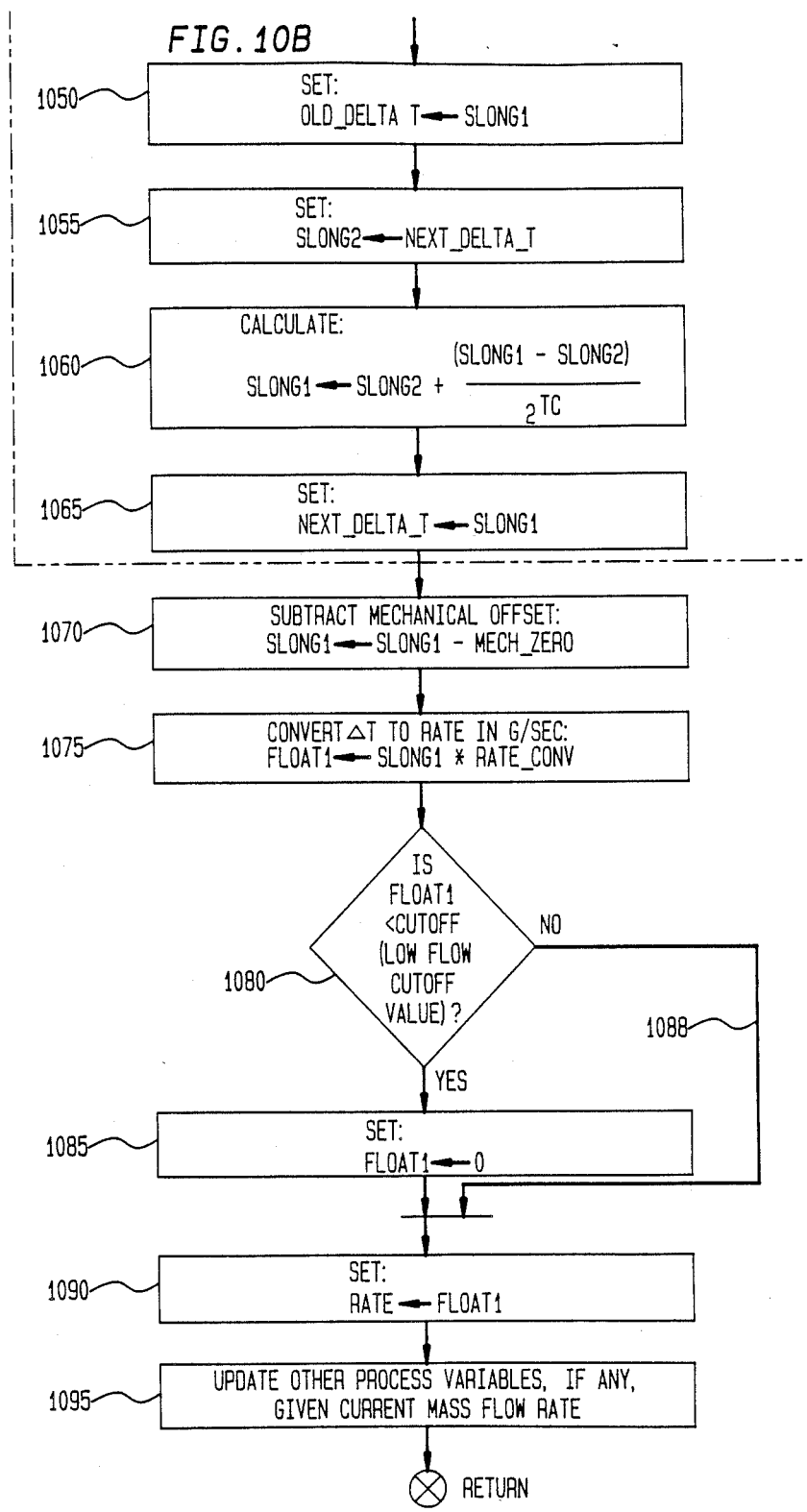

A flowchart of Tube Period Interrupt Routine 1000, that is also executed as part of Main Loop 800, is collectively depicted in FIGS. 10A and 10B, for which the correct alignment of the drawing sheets for these figures is shown in FIG. 10. As noted, Tube Period Interrupt Routine 1000 is executed once every two cycles of flow conduit (tube) movement to update the scaled frequency output.

Upon entry into routine 1000, execution proceeds to block 1005 which, when executed, disables all interrupts. Thereafter, block 1010 is executed to read current up and down count data stored in counters C1 and C2 located within counters 534 (see FIGS. 5A and 5B). As shown in FIGS. 10A and 10B, variable SINT1 stores the (up) count from counter C1; while variable SINT2 stores the (down) count from counter C2. All the interrupts are then enabled by execution of block 1015. Once this occurs, the time constant value (TC) is read from NOVRAM 570 (see FIGS. 5A and 5B). This value can be any one of several pre-defined values as selected by the user during system configuration and then stored in NOVRAM for subsequent use. Thereafter, as shown in FIGS. 10A and 10B, execution proceeds to block 1025 to calculate the current $\Delta t$ value. This value is determined merely by subtracting the counts stored within counters C1 and C2 that have accumulated during the current measuring interval. However, since these counters are not reset at the beginning of any measuring interval, the contents of these counters that existed at the end of the interval, SINT1 and SINT2, are subtracted from the corresponding contents that existed at the beginning of the measuring interval, OLD_UP_COUNT and OLD_DOWN_COUNT, respectively. $\Delta t$ is then computed by taking the difference between these two values. Once this computation has been made, execution proceeds to block 1028 which, when executed, saves the current counts as the OLD_UP_COUNT and OLD_DOWN_COUNT values for use during the next iteration through routine 1000 for the next set of two measuring intervals.

Now, once a value of $\Delta t$ has been calculated, the value is then digitally filtered through two pole filter routine 1030 that implements a digital filter having two identical poles. Specifically, upon entry into routine 1030, execution proceeds to block 1033 which, when executed, sets the value of temporary variable SLONG1 to the current value of $\Delta t$. Next, block 1035 is executed to appropriately scale the value of SLONG1 by multiplying its value by the hex value "4000". Thereafter, execution proceeds to block 1040 which sets the value of temporary variable SLONG2 to the value of variable OLD_DELTA_T. At this point, block 1045 is executed to provide the first pole of digital filtering. The resulting digitally filtered value SLONG1 is then saved by execution of block 1050 as variable OLD_DELTA_T for use during the next iteration through the routine 1000. Next, block 1055 executes to set the value of variable SLONG2 to the current value of variable NEXT_DELTA_T. Thereafter, execution proceeds to block 1060 which provides a second pole of digital filtering. Identical filter equations are used in blocks 1045 and 1060. The resulting filtered value of SLONG1 is then saved within variable NEXT_DELTA_T by execution of block 1065. As noted, the values of SLONG1, OLD_DELTA_T, SLONG2 and NEXT_DELTA_T are set to zero during initialization.

Once block 1065 executes, digital filtering has been completed at which point execution proceeds from routine 1030 to block 1070. This block, when executed, subtracts out the current value of any mechanical offset determined during conditions of zero flow from the value of variable SLONGI, i.e. the digitally filtered $\Delta t$ value. Thereafter, execution proceeds to block 1075 which converts the $\Delta t$ value stored in SLONGI by multiplication by a rate conversion factor to yield flow rate (FLOAT1) measured in grams/second. Next, execution proceeds to decision block 1080 which determines whether the current flow rate has a value less than a pre-determined low flow rate cutoff. If the current flow rate has such a value, then decision block 1080 routes execution, via its YES path, to block 1085 which, when executed, sets the value of variable FLOAT1, i.e. the current flow rate, to zero. Execution then proceeds to block 1090 which loads the value of variable FLOAT1 into variable RATE for use by 64 Hz interrupt routine 900. Alternatively, if the current flow rate has a value equal to or greater than the low flow rate cutoff, then decision block 1080 routes execution, via NO path 1088, directly to block 1090. Once block 1090 has executed, block 1095 is executed to update other process variables, if any, given the current mass flow rate value. Once this occurs, execution of routine 1000 is complete at which point execution then returns from this routine to main loop 800.

Clearly, those skilled in the art recognize that, although the disclosed embodiment utilizes U-shaped flow conduits, flow conduits of almost any size and shape may be used as long as the conduits can be oscillated about an axis to establish a non-inertial frame of reference. For example, these conduits may include but are not limited to straight tubes, S-shaped conduits or looped conduits. Moreover, although the meter has been shown as containing two parallel flow tubes, embodiments having a single flow tube or more than two parallel flow tubes—such as three, four or even more—may be used if desired.

Although a single embodiment of the invention has been shown and described herein, many other varied embodiments that incorporate the teachings of the present invention can be readily fabricated by those skilled in the art.

I claim:

1. A Coriolis mass flow rate meter comprising:
   at least one flow conduit;
   means for sensing movement of said flow conduit caused by opposing Coriolis forces induced by passage of a fluid through said flow conduit and for producing first and second sensor signals responsive to the sensed movement of said flow conduit;
   means for oscillating the flow conduit; and
   circuit means responsive to said first and second sensor signals for providing a mass flow rate value of the fluid, said circuit means comprising:
   means responsive to said first and second sensor signals for determining a time difference occurring among first and second measurement points located on said first sensor signal and a reference point situated on the second sensor signal and which temporally occurs between said first and second measurement points, wherein said time difference in duration occurring between the duration of a first interval of time occurring between said first measurement point and said reference point and the duration of a second interval of time occurring between said reference point and said second measurement point and wherein said time difference is a linear function of the value of the mass flow rate of the fluid passing through said flow conduit; and
   means responsive to said determined time difference for generating the mass flow rate value.

2. The meter in claim 1 wherein said first and second measuring points are situated on either sides of said reference point under conditions of no flow through said meter.

3. The meter in claim 2 wherein said first and second measuring points are substantially symmetrically situated on either sides of said reference point under conditions of no flow through said meter.

4. The meter in claim 3 further comprising first and second flow conduits and wherein said sensing means further comprises means for sensing the movement of both of said conduits such that said first and second sensor signals are responsive to the sensed movement of both of the flow conduits.

5. The meter in claim 4 wherein said circuit means further comprises:
   means for integrating said first and second sensor signals to generate corresponding first and second integrated signals; and
   means for comparing said first and second integrated signals against pre-defined first, second and third values to determine the occurrence of each of said two measurement points and said reference point and for providing associated comparator output signals.

6. The meter in claim 5 wherein said circuit means further comprises means, operative in response to said comparator output signals and clock signals of a pre-defined frequency, for measuring the duration of first and second time intervals, wherein said first time interval exists between said first measurement point and said reference point and said second time interval exists between said reference point and said second measurement point.

7. The meter in claim 6 wherein said duration measuring means further comprises:
   means, responsive to said comparator output signals, for generating first and second enable signals;
   first counting means, responsive to said first enable signal and said clock signals, for generating a first count representative of the duration of said first time interval;
   second counting means, responsive to said second enable signal and said clock signals, for generating a second count representative of the duration of said second time interval; and means, responsive to said first and second counting means, for subtracting the values of said first and second counts at an end of a pre-defined period of time to provide a value representative of said time difference interval.

8. The meter in claim 7 wherein said time difference determining means further comprises means for obtaining said time difference in response to the first and second counts occurring for at least first and second sets of said first and second measuring points and said reference point occurring over two cycles of oscillatory movement of said flow conduits.

9. The meter in claim 8 wherein said pre-defined first and second values are values of substantially equal magnitude but differing sign and said third value is zero.

10. The meter in claim 9 wherein said first set of said measurement and reference points occurs on a rising side of said first and second integrated sensor signals and said second set of said measurement and reference points occurs on a falling side of said first and second integrated sensor signals.

11. The meter in claim 10 wherein said circuit means further comprises means for totalizing the value of said measured mass flow rate value over said pre-defined time period so as to yield a value of totalized flow of said fluid passing through said flow conduits.

12. The meter in claim 11 further comprising:
  inlet and outlet manifolds for respectively conducting said fluid into and out of both of said flow conduits, wherein said inlet manifold divides the fluid between both of said conduits and said outlet manifold combines the fluid exiting from both of said conduits;
  first and second mounting blocks, which receive corresponding ends of both of said flow conduits and are fixedly secured to said inlet and outlet manifolds, for respectively dividing the fluid emanating from said inlet manifold and routing said divided fluid into both of said flow conduits or combining the fluid emanating from both of said flow conduits and routing the combined fluid into said outlet manifold; and
  means, responsive to a drive signal, for vibrating both of said flow conduits in an opposing sinusoidal pattern.

13. In a Coriolis mass flow rate meter having at least one flow conduit, a method of measuring mass flow rate of a fluid passing through said meter comprising the steps of:
  sensing movement of said flow conduit caused by opposing Coriolis forces induced by passage of a fluid through said flow conduit and for producing first and second sensor signals responsive to said sensed movement of said flow conduit;
  oscillating the flow conduit;
  determining, in response to said first and second sensor signals, a time difference occurring among first and second measurement points located on said first sensor signal and a reference point situated on the second sensor signal and which temporally occurs between said first and second measurement points, wherein said time difference substantially equals a difference in duration occurring between the duration of a first interval of time occurring between said first measurement point and said reference point and the duration of a second interval of time occurring between said reference point and said second measurement point and wherein said difference is a linear function of the value of the mass flow rate of the fluid passing through said flow conduit; and
  generating, in response to said determined time difference, a measured value of the mass flow rate of said fluid.

14. The method in claim 13 wherein said first and second measuring points are situated on either sides of said reference point under conditions of no flow through said meter.

15. The method in claim 14 wherein said first and second measuring points are substantially symmetrically situated on either sides of said reference point under conditions of no flow through said meter.

16. The method in claim 15 wherein said movement sensing step includes the step of sensing movement of first and second flow conduits such that said first and second sensor signals are responsive to the sensed movement of both of the flow conduits.

17. The method in claim 16 further comprising the steps of:
  integrating said first and second sensor signals to generate corresponding first and second integrated signals; and
  comparing said first and second integrated signals against pre-defined first, second and third values to determine the occurrence of each of said two measurement points and said reference point and for providing associated comparator output signals.

18. The method in claim 17 further comprising the step of measuring, in response to said comparator output signals and clock signals of a pre-defined frequency, the duration of first and second time intervals, wherein said first time interval exists between said first measurement point and said reference point and said second time interval exists between said reference point and said second measurement point.

19. The method in claim 18 wherein said duration measuring step further comprises the steps of:
  generating, in response to said comparator output signals, first and second enable signals;
  generating, in response to said first enable signal and said clock signals, a first count representative of the duration of said first time interval;
  generating, in response to said second enable signal and said clock signals, a second count representative of the duration of said second time interval; and
  subtracting the values of said first and second counts at an end of a pre-defined period of time to provide a value representative of said time difference interval.

20. The method in claim 19 wherein said time difference determining step further comprises the step of obtaining said time difference in response to the first and second counts occurring for at least first and second sets of said first and second measuring points and said reference point occurring over two cycles of oscillatory movement of said flow conduits.

21. The method in claim 20 wherein said pre-defined first and second values are values of substantially equal magnitude but differing sign and said third value is zero.

22. The method in claim 21 wherein said first set of said measurement and reference points occurs on a rising side of said first and second integrated sensor signals and said second set of said measurement and reference points occurs on a falling side of said first and second integrated sensor signals.

23. The method in claim 22 further comprises the step of totalizing the value of said measured mass flow rate value over said pre-defined time period so as to yield a value of totalized flow of said fluid passing through said flow conduits.

* * * * *

UNITED STATES PATENT AND TRADEMARK OFFICE
CERTIFICATE OF CORRECTION

PATENT NO. : 4,879,911

DATED : Nov. 14, 1989

INVENTOR(S) : Michael J. Zolock

It is certified that error appears in the above-identified patent and that said Letters Patent is hereby corrected as shown below:

Column 22, line 11, after "difference" insert --substantially equals a
    difference--.

Signed and Sealed this

Fourth Day of May, 1993

Attest:

MICHAEL K. KIRK

Attesting Officer

Acting Commissioner of Patents and Trademarks